US010439762B2

(12) United States Patent
Zhang

(10) Patent No.: US 10,439,762 B2
(45) Date of Patent: Oct. 8, 2019

(54) INFORMATION TRANSMISSION METHOD, APPARATUS, AND DEVICE

(71) Applicant: Huawei Technologies Co., Ltd., Shenzhen (CN)

(72) Inventor: Shunqing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 15/600,502

(22) Filed: May 19, 2017

(65) Prior Publication Data

US 2017/0272210 A1 Sep. 21, 2017

Related U.S. Application Data

(63) Continuation of application No. PCT/CN2014/091899, filed on Nov. 21, 2014.

(51) Int. Cl.
*H04L 5/14* (2006.01)
*H04L 1/00* (2006.01)
(Continued)

(52) U.S. Cl.
CPC ............ *H04L 1/0075* (2013.01); *G06F 16/84* (2019.01); *H04L 1/0003* (2013.01);
(Continued)

(58) Field of Classification Search
None
See application file for complete search history.

(56) References Cited

U.S. PATENT DOCUMENTS 6,310,909 B1 * 10/2001 Jones .................... H04L 5/0046
375/220
6,532,267 B1 * 3/2003 Heegard ........... H04L 25/03343
375/220
(Continued)

FOREIGN PATENT DOCUMENTS

CN 103220254 A 7/2013
EP 1903737 A1 3/2008
(Continued)

OTHER PUBLICATIONS

Popovski et al., "Deliverable D2.2 Document No. ICT-317669-METIS/D2.2; Project Name: Mobile and wireless communications Enablers for the Twenty-twenty Information Society (METIS), Deliverable D2.2 Novel radio link concepts and state of the art analysis," METIS, XP055248875, pp. i-69, Seventh Framework Programme (Oct. 31, 2013).
(Continued)

*Primary Examiner* — Bob A Phunkulh
(74) *Attorney, Agent, or Firm* — Leydig, Voit & Mayer, Ltd.

(57) ABSTRACT

Embodiments of the present invention provide a transmission status determining method, where the method includes: receiving, by a receive end device in a first time period, a first symbol sequence sent by a transmit end device; determining a first modulation parameter set according to the first symbol sequence; and determining, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, and the second time period is later than the first time period.

24 Claims, 7 Drawing Sheets

(51) Int. Cl.
| | |
|---|---|
| *G06F 16/84* | (2019.01) |
| *H04L 27/34* | (2006.01) |
| *H04L 27/00* | (2006.01) |
| *H04L 25/03* | (2006.01) |
| *H04L 5/00* | (2006.01) |
| *H04L 1/18* | (2006.01) |

(52) U.S. Cl.
CPC .......... *H04L 1/0006* (2013.01); *H04L 1/0007* (2013.01); *H04L 1/0009* (2013.01); *H04L 1/0015* (2013.01); *H04L 1/0038* (2013.01); *H04L 5/0064* (2013.01); *H04L 25/03898* (2013.01); *H04L 27/0008* (2013.01); *H04L 27/0012* (2013.01); *H04L 27/0014* (2013.01); *H04L 27/34* (2013.01); *H04L 1/0017* (2013.01); *H04L 1/18* (2013.01); *H04L 5/0007* (2013.01); *H04L 5/0021* (2013.01); *H04L 2027/0018* (2013.01)

(56) References Cited

U.S. PATENT DOCUMENTS

| | | | |
|---|---|---|---|
| 6,879,626 | B1 | 4/2005 | Sudo |
| 2004/0137848 | A1 | 7/2004 | Saito et al. |
| 2006/0193290 | A1 | 8/2006 | Suzuki et al. |
| 2006/0251184 | A1* | 11/2006 | Cameron ............ H03M 13/151 375/295 |
| 2006/0291579 | A1* | 12/2006 | Duan ................... H04L 1/0071 375/264 |
| 2009/0187949 | A1 | 7/2009 | Vare et al. |
| 2010/0202334 | A1 | 8/2010 | Soliman et al. |
| 2010/0240313 | A1 | 9/2010 | Kawai |
| 2010/0309861 | A1 | 12/2010 | Gorokhov et al. |
| 2010/0322358 | A1* | 12/2010 | Drumm ............ H03M 13/2957 375/341 |
| 2011/0158349 | A1* | 6/2011 | Wu ................... H04L 27/3411 375/298 |
| 2011/0211520 | A1* | 9/2011 | Gerstenberger .... H04L 27/3405 370/312 |
| 2012/0027125 | A1* | 2/2012 | Zhou .................... H04L 1/0025 375/297 |
| 2012/0213307 | A1* | 8/2012 | Perry ................... H04L 1/0007 375/285 |
| 2012/0327846 | A1* | 12/2012 | Wu ...................... H04L 1/0077 370/315 |
| 2014/0016570 | A1 | 1/2014 | Ma et al. |
| 2014/0254455 | A1 | 9/2014 | Nikopour et al. |
| 2015/0003557 | A1* | 1/2015 | Perry ................... H04L 1/0041 375/285 |

FOREIGN PATENT DOCUMENTS

| | | |
|---|---|---|
| JP | 2000324081 A | 11/2000 |
| JP | 3555943 B2 | 8/2004 |
| JP | 2006229635 A | 8/2006 |
| JP | 2008118692 A | 5/2008 |
| JP | 2012517782 A | 8/2012 |
| RU | 2486678 C2 | 6/2013 |
| WO | 2007148784 A1 | 12/2007 |

OTHER PUBLICATIONS

Popovski et al., "Deliverable D2.3 Components of a new air interface—building blocks and performance; Project Name: Mobile and wireless communications Enablers for the Twenty-Twenty Information Society Author(s)," METIS, XP055175077, pp. i-103, Seventh Framework Programme (Apr. 30, 2014).

Hoshyar et al., "LDS-OFDM an Efficient Multiple Access Technique," pp. 1-5, Institute of Electrical and Electronics Engineers, New York, New York, (2010).

Razavi et al., "On Receiver Design for Uplink Low Density Signature OFDM (LDS-OFDM)," IEEE Transactions on Communications, pp. 3499-3508, vol. 60, No. 11, Institute of Electrical and Electronics Engineers, New York, New York, (Nov. 2012).

Nikopour et al., "Sparse Code Multiple Access," IEEE 24$^{th}$ International Symposium on Personal, Indoor and Mobile Radio Communications: Fundamentals and PHY Track, pp. 332-336, Institute of Electrical and Electronics Engineers, New York , New York, (2013).

Japanese Patent Application No. 2017-527575, Notice of Allowance (dated Sep. 20, 2018).

Bayesteh et al, "Blind Detection of SCMA for Uplink Grant-Free Multiple-Access," 2014 11th International Symposium on Wireless Communications Systems(ISWCS), pp. 853-857, Institute of Electrical and Electronics Engineers—New York, New York (Oct. 23, 2014).

KR No. 10-2017-7016961, Office Action, dated Jul. 4, 2019.

\* cited by examiner

200

S210 — A receive end device receives, in a first time period, a first symbol sequence sent by a transmit end device S220 — Determine a first modulation parameter set according to the first symbol sequence, where the first modulation parameter set is a modulation parameter set used when the transmit end device performs modulation processing to generate the first symbol sequence, and the modulation parameter set includes at least one of the following: a constellation point set or a codebook S230 — Determine, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and $N \geq 2$

```
Determine a first transmission status, where the first
transmission status is a transmission status of a transmit end      S310
device in a second time period
```

```
Determine, according to preset first mapping relationship
information, a first modulation parameter set corresponding to
the first transmission status, where the first mapping relationship
information is used to indicate a one-to-one mapping relationship
between N transmission statuses and N modulation parameter          S320
sets, the first modulation parameter set belongs to the N
modulation parameter sets, the first transmission status belongs
to the N transmission statuses, N≥2, and the modulation
parameter set includes at least one of the following: a
constellation point set or a codebook
```

```
Perform modulation processing according to the first
modulation parameter set to generate a first symbol sequence,
and transmit the first symbol sequence to a receive end device      S330
in a first time period, where the second time period is later than
the first time period
```

FIG. 4

INFORMATION TRANSMISSION METHOD, APPARATUS, AND DEVICE

CROSS-REFERENCE TO RELATED APPLICATIONS

This application is a continuation of International Patent Application No. PCT/CN2014/091899, filed on Nov. 21, 2014, the disclosure of which is hereby incorporated by reference in its entirety.

TECHNICAL FIELD

Embodiments of the present invention relate to the field of communications, and more specifically, to an information transmission method, apparatus, and device.

BACKGROUND

Currently, in a known information transmission technology, a transmit end device may notify a receive end device of a status (for ease of understanding and description, referred to as a transmission status in the following) of the transmit end device. For example, the transmit end device is in a transmit state or a non-transmit state. Therefore, the transmit end device and the receive end device may select an air interface transmission technology corresponding to the transmission status, for example, a transmit waveform of an air interface, a frame structure, a retransmission technology, or a code modulation technology, so that the foregoing various air interface transmission technologies can be flexibly used, communication quality is enhanced, and user experience is improved.

However, in this technology, a communications system needs to provide dedicated communication resources and signaling to transmit, between the transmit end device and the receive end device, information that indicates the foregoing transmission statuses, causing interaction between the transmit end device and the receive end device to be complex and communication resource overheads to be increased.

SUMMARY

Embodiments of the present invention provide an information transmission method, apparatus, and device, which can simplify interaction between a transmit end device and a receive end device.

A first aspect provides a transmission status determining method, where the method includes: receiving, by a receive end device in a first time period, a first symbol sequence sent by a transmit end device; determining a first modulation parameter set according to the first symbol sequence, where the first modulation parameter set is a modulation parameter set used when the transmit end device performs modulation processing to generate the first symbol sequence, and the modulation parameter set includes at least one of the following: a constellation point set or a codebook; and determining, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and $N \geq 2$.

With reference to the first aspect, in a first implementation manner of the first aspect, the method further includes: determining, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

With reference to the first aspect and the foregoing implementation manner, in a second implementation manner of the first aspect, the method further includes: receiving, in the second time period according to the second transmission parameter set, a second symbol sequence transmitted by the transmit end device.

With reference to the first aspect and the foregoing implementation manners, in a third implementation manner of the first aspect, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

With reference to the first aspect and the foregoing implementation manners, in a fourth implementation manner of the first aspect, the receiving, by a receive end device in a first time period, a first symbol sequence sent by a transmit end device includes: when it is determined that no information is transmitted between the transmit end device and the receive end device within a first preset duration range earlier than the first time period, receiving, by the receive end device in the first time period according to a preset first transmission parameter set, the first symbol sequence sent by the transmit end device, where the first transmission parameter set includes at least one of the following transmission parameters: a frame structure, a retransmission policy, or a Modulation and coding scheme.

With reference to the first aspect and the foregoing implementation manners, in a fifth implementation manner of the first aspect, the determining a first modulation parameter set according to the first symbol sequence includes: intercepting a symbol subsequence from the first symbol sequence, where the symbol subsequence includes at least two symbols; and determining the first modulation parameter set according to the symbol subsequence.

With reference to the first aspect and the foregoing implementation manners, in a sixth implementation manner of the first aspect, the symbol subsequence is the first K symbols in the first symbol sequence, where K is a preset value, and $K \geq 2$; or the symbol subsequence includes symbols in the first symbol sequence that are received when quality of a channel between the receive end device and the network device meets a preset condition.

With reference to the first aspect and the foregoing implementation manners, in a seventh implementation manner of the first aspect, the N transmission statuses include at least one of the following states: a small-sized packet transmission state, a common transmission state, or a large-throughput transmission state.

With reference to the first aspect and the foregoing implementation manners, in an eighth implementation manner of the first aspect, when the N transmission statuses include the small-sized packet transmission state, in a transmission parameter set corresponding to the small-sized packet transmission state: if the transmission parameter includes a frame structure, the frame structure is a frame structure with a frame length less than 1 ms; if the transmission parameter includes a retransmission policy, the retransmission policy is fast retransmission; or if the transmission parameter includes a Modulation and coding scheme, the Modulation and coding scheme is a multi-element low-density parity-check code or a polar code.

With reference to the first aspect and the foregoing implementation manners, in a ninth implementation manner of the first aspect, when the N transmission statuses include the large-throughput transmission state, in a transmission parameter set corresponding to the large-throughput transmission state: if the transmission parameter includes a frame structure, the frame structure is a frame structure with a frame length greater than 1 ms; if the transmission parameter includes a retransmission policy, the retransmission policy is rateless transmission; or if the transmission parameter includes a Modulation and coding scheme, the Modulation and coding scheme is a low-density parity-check code.

With reference to the first aspect and the foregoing implementation manners, in a tenth implementation manner of the first aspect, when the N transmission statuses include the common transmission state, in a transmission parameter set corresponding to the common transmission state: if the transmission parameter includes a frame structure, the frame structure is a frame structure with a frame length equal to 1 ms; if the transmission parameter includes a retransmission policy, the retransmission policy is standard retransmission; or if the transmission parameter includes a Modulation and coding scheme, the Modulation and coding scheme is a low-density parity-check code or a Turbo code.

A second aspect provides an information transmission method, where the method includes: determining a first transmission status, where the first transmission status is a transmission status of the transmit end device in a second time period; determining, according to preset first mapping relationship information, a first modulation parameter set corresponding to the first transmission status, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, N≥2, and the modulation parameter set includes at least one of the following: a constellation point set or a codebook; and performing modulation processing according to the first modulation parameter set to generate a first symbol sequence, and transmitting the first symbol sequence to a receive end device in a first time period, where the second time period is later than the first time period.

With reference to the second aspect, in a first implementation manner of the second aspect, the method further includes: determining, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

With reference to the second aspect and the foregoing implementation manner, in a second implementation manner of the second aspect, the method further includes: transmitting a second symbol sequence to the receive end device in the second time period according to the second transmission parameter set.

With reference to the second aspect and the foregoing implementation manners, in a third implementation manner of the second aspect, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

With reference to the second aspect and the foregoing implementation manners, in a fourth implementation manner of the second aspect, the transmitting the first symbol sequence to a receive end device in a first time period includes: when it is determined that no information is transmitted between the transmit end device and the receive end device within a first preset duration range earlier than the first time period, transmitting the first symbol sequence to the receive end device according to a preset first transmission parameter set, where the first transmission parameter set includes at least one of the following transmission parameters: a frame structure, a retransmission policy, or a Modulation and coding scheme.

With reference to the second aspect and the foregoing implementation manners, in a fifth implementation manner of the second aspect, the N transmission statuses include at least one of the following states: a small-sized packet transmission state, a common transmission state, or a large-throughput transmission state.

With reference to the second aspect and the foregoing implementation manners, in a sixth implementation manner of the second aspect, when the N transmission statuses include the small-sized packet transmission state, in a transmission parameter set corresponding to the small-sized packet transmission state: if the transmission parameter includes a frame structure, the frame structure is a frame structure with a frame length less than 1 ms; if the transmission parameter includes a retransmission policy, the retransmission policy is fast retransmission; or if the transmission parameter includes a Modulation and coding scheme, the Modulation and coding scheme is a multi-element low-density parity-check code or a polar code.

With reference to the second aspect and the foregoing implementation manners, in a seventh implementation manner of the second aspect, when the N transmission statuses include the large-throughput transmission state, in a transmission parameter set corresponding to the large-throughput transmission state: if the transmission parameter includes a frame structure, the frame structure is a frame structure with a frame length greater than 1 ms; if the transmission parameter includes a retransmission policy, the retransmission policy is rateless transmission; or if the transmission parameter includes a Modulation and coding scheme, the Modulation and coding scheme is a low-density parity-check code.

With reference to the second aspect and the foregoing implementation manners, in an eighth implementation manner of the second aspect, when the N transmission statuses include the common transmission state, in a transmission parameter set corresponding to the common transmission state: if the transmission parameter includes a frame structure, the frame structure is a frame structure with a frame length equal to 1 ms; if the transmission parameter includes a retransmission policy, the retransmission policy is standard retransmission; or if the transmission parameter includes a Modulation and coding scheme, the Modulation and coding scheme is a low-density parity-check code or a Turbo code.

A third aspect provides a transmission status determining apparatus, where the apparatus includes: a receiving unit, configured to receive, in a first time period, a first symbol sequence sent by a transmit end device; and a determining unit, configured to: determine a first modulation parameter set according to the first symbol sequence, where the first modulation parameter set is a modulation parameter set used when the transmit end device performs modulation processing to generate the first symbol sequence, and the modulation parameter set includes at least one of the following: a constellation point set or a codebook; and determine, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and N≥2.

With reference to the third aspect, in a first implementation manner of the third aspect, the determining unit is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

With reference to the third aspect and the foregoing implementation manner, in a second implementation manner of the third aspect, the receiving unit is further configured to receive, in the second time period according to the second transmission parameter set, a second symbol sequence transmitted by the transmit end device.

With reference to the third aspect and the foregoing implementation manners, in a third implementation manner of the third aspect, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

With reference to the third aspect and the foregoing implementation manners, in a fourth implementation manner of the third aspect, the receiving unit is specifically configured to: when it is determined that no information is transmitted between the transmit end device and the receive end device within a first preset duration range earlier than the first time period, receive, by the receive end device in the first time period according to a preset first transmission parameter set, the first symbol sequence sent by the transmit end device, where the first transmission parameter set includes at least one of the following transmission parameters: a frame structure, a retransmission policy, or a Modulation and coding scheme.

With reference to the third aspect and the foregoing implementation manners, in a fifth implementation manner of the third aspect, the determining unit is specifically configured to: intercept a symbol subsequence from the first symbol sequence, where the symbol subsequence includes at least two symbols; and determine the first modulation parameter set according to the symbol subsequence.

With reference to the third aspect and the foregoing implementation manners, in a sixth implementation manner of the third aspect, the symbol subsequence is the first K symbols in the first symbol sequence, where K is a preset value, and K≥2; or the symbol subsequence includes symbols in the first symbol sequence that are received when quality of a channel between the receive end device and the network device meets a preset condition.

With reference to the third aspect and the foregoing implementation manners, in a seventh implementation manner of the third aspect, the N transmission statuses include at least one of the following states: a small-sized packet transmission state, a common transmission state, or a large-throughput transmission state.

With reference to the third aspect and the foregoing implementation manners, in an eighth implementation manner of the third aspect, when the N transmission statuses include the small-sized packet transmission state, in a transmission parameter set corresponding to the small-sized packet transmission state: if the transmission parameter includes a frame structure, the frame structure is a frame structure with a frame length less than 1 ms; if the transmission parameter includes a retransmission policy, the retransmission policy is fast retransmission; or if the transmission parameter includes a Modulation and coding scheme, the Modulation and coding scheme is a multi-element low-density parity-check code or a polar code.

With reference to the third aspect and the foregoing implementation manners, in a ninth implementation manner of the third aspect, when the N transmission statuses include the large-throughput transmission state, in a transmission parameter set corresponding to the large-throughput transmission state: if the transmission parameter includes a frame structure, the frame structure is a frame structure with a frame length greater than 1 ms; if the transmission parameter includes a retransmission policy, the retransmission policy is rateless transmission; or if the transmission parameter includes a Modulation and coding scheme, the Modulation and coding scheme is a low-density parity-check code.

With reference to the third aspect and the foregoing implementation manners, in a tenth implementation manner of the third aspect, when the N transmission statuses include the common transmission state, in a transmission parameter set corresponding to the common transmission state: if the transmission parameter includes a frame structure, the frame structure is a frame structure with a frame length equal to 1 ms; if the transmission parameter includes a retransmission policy, the retransmission policy is standard retransmission; or if the transmission parameter includes a Modulation and coding scheme, the Modulation and coding scheme is a low-density parity-check code or a Turbo code.

A fourth aspect provides an information transmission apparatus, where the apparatus includes: a determining unit, configured to: determine a first transmission status, where the first transmission status is a transmission status of the transmit end device in a second time period; and determine, according to preset first mapping relationship information, a first modulation parameter set corresponding to the first transmission status, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, N≥2, and the modulation parameter set includes at least one of the following: a constellation point set or a codebook; and a sending unit, configured to perform modulation processing according to the first modulation parameter set to generate a first symbol sequence, and transmit the first symbol sequence to a receive end device in a first time period, where the second time period is later than the first time period.

With reference to the fourth aspect, in a first implementation manner of the fourth aspect, the determining unit is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

With reference to the fourth aspect and the foregoing implementation manner, in a second implementation manner of the fourth aspect, the sending unit is further configured to transmit a second symbol sequence to the receive end device in the second time period according to the second transmission parameter set.

With reference to the fourth aspect and the foregoing implementation manners, in a third implementation manner of the fourth aspect, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

With reference to the fourth aspect and the foregoing implementation manners, in a fourth implementation manner of the fourth aspect, the sending unit is specifically configured to: when it is determined that no information is transmitted between the transmit end device and the receive end device within a first preset duration range earlier than the first time period, transmit the first symbol sequence to the receive end device according to a preset first transmission parameter set, where the first transmission parameter set includes at least one of the following transmission parameters: a frame structure, a retransmission policy, or a Modulation and coding scheme.

With reference to the fourth aspect and the foregoing implementation manners, in a fifth implementation manner of the fourth aspect, the N transmission statuses include at least one of the following states: a small-sized packet transmission state, a common transmission state, or a large-throughput transmission state.

With reference to the fourth aspect and the foregoing implementation manners, in a sixth implementation manner of the fourth aspect, when the N transmission statuses include the small-sized packet transmission state, in a transmission parameter set corresponding to the small-sized packet transmission state: if the transmission parameter includes a frame structure, the frame structure is a frame structure with a frame length less than 1 ms; if the transmission parameter includes a retransmission policy, the retransmission policy is fast retransmission; or if the transmission parameter includes a Modulation and coding scheme, the Modulation and coding scheme is a multi-element low-density parity-check code or a polar code.

With reference to the fourth aspect and the foregoing implementation manners, in a seventh implementation manner of the fourth aspect, when the N transmission statuses include the large-throughput transmission state, in a transmission parameter set corresponding to the large-throughput transmission state: if the transmission parameter includes a frame structure, the frame structure is a frame structure with a frame length greater than 1 ms; if the transmission parameter includes a retransmission policy, the retransmission policy is rateless transmission; or if the transmission parameter includes a Modulation and coding scheme, the Modulation and coding scheme is a low-density parity-check code.

With reference to the fourth aspect and the foregoing implementation manners, in an eighth implementation manner of the fourth aspect, when the N transmission statuses include the common transmission state, in a transmission parameter set corresponding to the common transmission state: if the transmission parameter includes a frame structure, the frame structure is a frame structure with a frame length equal to 1 ms; if the transmission parameter includes a retransmission policy, the retransmission policy is standard retransmission; or if the transmission parameter includes a Modulation and coding scheme, the Modulation and coding scheme is a low-density parity-check code or a Turbo code.

A fifth aspect provides a transmission status determining device, where the device includes: a bus; a processor connected to the bus; a memory connected to the bus; and a receiver connected to the bus, where the processor invokes, by using the bus, a program stored in the memory, to be configured to control the receiver to receive, in a first time period, a first symbol sequence sent by a transmit end device; configured to determine a first modulation parameter set according to the first symbol sequence, where the first modulation parameter set is a modulation parameter set used when the transmit end device performs modulation processing to generate the first symbol sequence, and the modulation parameter set includes at least one of the following: a constellation point set or a codebook; and configured to determine, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and N≥2.

With reference to the fifth aspect, in a first implementation manner of the fifth aspect, the processor is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

With reference to the fifth aspect and the foregoing implementation manner, in a second implementation manner of the fifth aspect, the processor is further configured to control the receiver to receive, in the second time period according to the second transmission parameter set, a second symbol sequence transmitted by the transmit end device.

With reference to the fifth aspect and the foregoing implementation manners, in a third implementation manner of the fifth aspect, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

With reference to the fifth aspect and the foregoing implementation manners, in a fourth implementation manner of the fifth aspect, the processor is specifically configured to: when it is determined that no information is transmitted between the transmit end device and the receive end device within a first preset duration range earlier than the first time period, control the receiver to receive, in the first time period according to a preset first transmission parameter set, the first symbol sequence sent by the transmit end device, where the first transmission parameter set includes at least one of the following transmission parameters: a frame structure, a retransmission policy, or a Modulation and coding scheme.

With reference to the fifth aspect and the foregoing implementation manners, in a fifth implementation manner of the fifth aspect, the processor is specifically configured to: intercept a symbol subsequence from the first symbol sequence, where the symbol subsequence includes at least two symbols; and determine the first modulation parameter set according to the symbol subsequence.

With reference to the fifth aspect and the foregoing implementation manners, in a sixth implementation manner of the fifth aspect, the symbol subsequence is the first K symbols in the first symbol sequence, where K is a preset value, and K≥2; or the symbol subsequence includes symbols in the first symbol sequence that are received when quality of a channel between the receive end device and the network device meets a preset condition.

With reference to the fifth aspect and the foregoing implementation manners, in a seventh implementation manner of the fifth aspect, the N transmission statuses include at least one of the following states: a small-sized packet transmission state, a common transmission state, or a large-throughput transmission state.

With reference to the fifth aspect and the foregoing implementation manners, in an eighth implementation manner of the fifth aspect, when the N transmission statuses include the small-sized packet transmission state, in a transmission parameter set corresponding to the small-sized packet transmission state: if the transmission parameter includes a frame structure, the frame structure is a frame structure with a frame length less than 1 ms; if the transmission parameter includes a retransmission policy, the retransmission policy is fast retransmission; or if the transmission parameter includes a Modulation and coding scheme, the Modulation and coding scheme is a multi-element low-density parity-check code or a polar code.

With reference to the fifth aspect and the foregoing implementation manners, in a ninth implementation manner of the fifth aspect, when the N transmission statuses include the large-throughput transmission state, in a transmission parameter set corresponding to the large-throughput transmission state: if the transmission parameter includes a frame structure, the frame structure is a frame structure with a frame length greater than 1 ms; if the transmission parameter includes a retransmission policy, the retransmission policy is rateless transmission; or if the transmission parameter includes a Modulation and coding scheme, the Modulation and coding scheme is a low-density parity-check code.

With reference to the fifth aspect and the foregoing implementation manners, in a tenth implementation manner of the fifth aspect, when the N transmission statuses include the common transmission state, in a transmission parameter set corresponding to the common transmission state: if the transmission parameter includes a frame structure, the frame structure is a frame structure with a frame length equal to 1 ms; if the transmission parameter includes a retransmission policy, the retransmission policy is standard retransmission; or if the transmission parameter includes a Modulation and coding scheme, the Modulation and coding scheme is a low-density parity-check code or a Turbo code.

A sixth aspect provides an information transmission device, where the device includes: a bus; a processor connected to the bus; a memory connected to the bus; and a transmitter connected to the bus, where the processor invokes, by using the bus, a program stored in the memory, to be configured to determine a first transmission status, where the first transmission status is a transmission status of the transmit end device in a second time period; configured to determine, according to preset first mapping relationship information, a first modulation parameter set corresponding to the first transmission status, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, N≥2, and the modulation parameter set includes at least one of the following: a constellation point set or a codebook; and configured to perform modulation processing according to the first modulation parameter set to generate a first symbol sequence, and control the transmitter to transmit the first symbol sequence to a receive end device in a first time period, where the second time period is later than the first time period.

With reference to the sixth aspect, in a first implementation manner of the sixth aspect, the processor is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

With reference to the sixth aspect and the foregoing implementation manner, in a second implementation manner of the sixth aspect, the processor is further configured to control the transmitter to transmit a second symbol sequence to the receive end device in the second time period according to the second transmission parameter set.

With reference to the sixth aspect and the foregoing implementation manners, in a third implementation manner of the sixth aspect, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

With reference to the sixth aspect and the foregoing implementation manners, in a fourth implementation manner of the sixth aspect, the processor is specifically configured to: when it is determined that no information is transmitted between the transmit end device and the receive end device within a first preset duration range earlier than the first time period, control the transmitter to transmit the first symbol sequence to the receive end device according to a preset first transmission parameter set, where the first transmission parameter set includes at least one of the following transmission parameters: a frame structure, a retransmission policy, or a Modulation and coding scheme.

With reference to the sixth aspect and the foregoing implementation manners, in a fifth implementation manner of the sixth aspect, the N transmission statuses include at least one of the following states: a small-sized packet transmission state, a common transmission state, or a large-throughput transmission state.

With reference to the sixth aspect and the foregoing implementation manners, in a sixth implementation manner of the sixth aspect, when the N transmission statuses include the small-sized packet transmission state, in a transmission parameter set corresponding to the small-sized packet transmission state: if the transmission parameter includes a frame structure, the frame structure is a frame structure with a frame length less than 1 ms; if the transmission parameter includes a retransmission policy, the retransmission policy is fast retransmission; or if the transmission parameter includes a Modulation and coding scheme, the Modulation and coding scheme is a multi-element low-density parity-check code or a polar code.

With reference to the sixth aspect and the foregoing implementation manners, in a seventh implementation manner of the sixth aspect, when the N transmission statuses include the large-throughput transmission state, in a transmission parameter set corresponding to the large-throughput transmission state: if the transmission parameter includes a frame structure, the frame structure is a frame structure with a frame length greater than 1 ms; if the transmission parameter includes a retransmission policy, the retransmission policy is rateless transmission; or if the transmission parameter includes a Modulation and coding scheme, the Modulation and coding scheme is a low-density parity-check code.

With reference to the sixth aspect and the foregoing implementation manners, in an eighth implementation manner of the sixth aspect, when the N transmission statuses include the common transmission state, in a transmission parameter set corresponding to the common transmission state: if the transmission parameter includes a frame structure, the frame structure is a frame structure with a frame length equal to 1 ms; if the transmission parameter includes a retransmission policy, the retransmission policy is standard retransmission; or if the transmission parameter includes a Modulation and coding scheme, the Modulation and coding scheme is a low-density parity-check code or a Turbo code.

According to the information transmission method, apparatus, and device in the embodiments of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 is a schematic flowchart of an information transmission method according to an embodiment of the present invention;

FIG. 4 is a schematic flowchart of an information transmission method according to another embodiment of the present invention;

DESCRIPTION OF EMBODIMENTS

Figure 1:
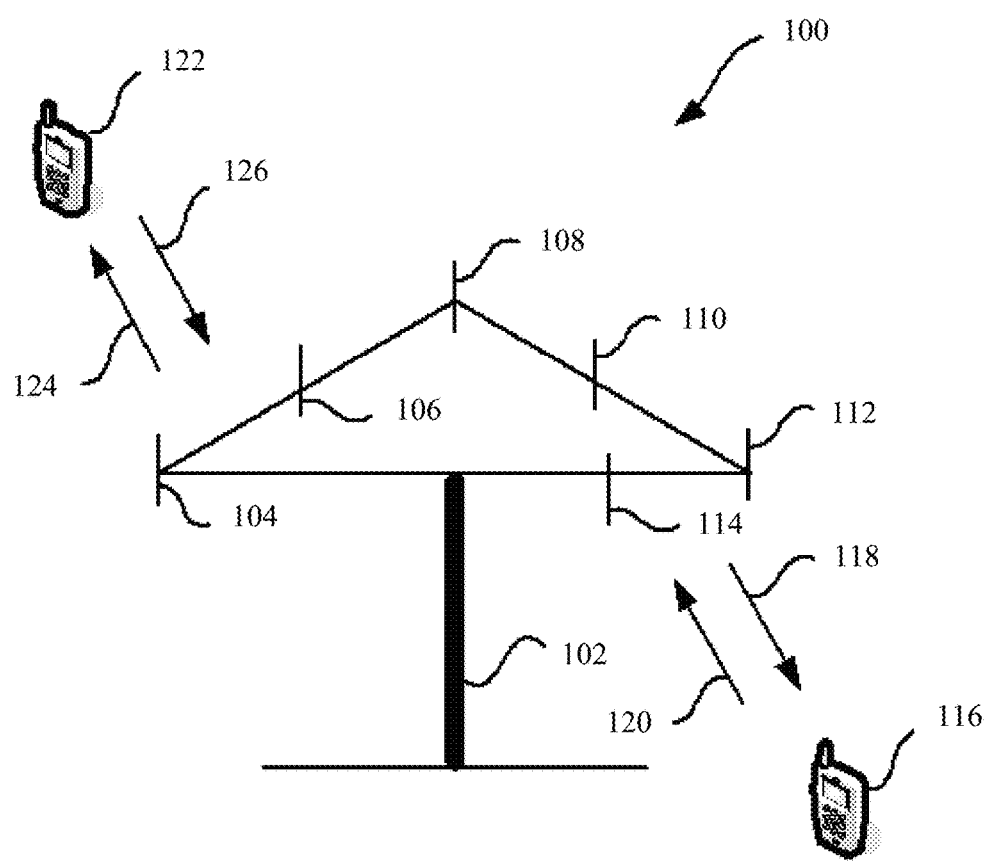
FIG. 1 is a schematic diagram of a communications system to which an information transmission method in the present invention is applicable.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

The embodiments are described with reference to a terminal device in the present invention. The terminal device may also be referred to as user equipment (UE, User Equipment), an access terminal, a subscriber unit, a subscriber station, a mobile station, a remote station, a remote terminal, a mobile device, a user terminal, a terminal, a wireless communications device, a user agent, a user apparatus, or the like. The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a hand-held device having a wireless communication function, a computing device, another processing device connected to a wireless modem, an in-vehicle device, a wearable device, or a terminal device in a future 5G network.

In addition, the embodiments are described with reference to a network device in the present invention. The network device may be a device such as a base station, and the base station can be used to communicate with a mobile device. The base station may be a BTS (Base Transceiver Station, base transceiver station) in GSM (Global System for Mobile communication, Global System for Mobile Communications) or CDMA (Code Division Multiple Access, Code Division Multiple Access); or may be an NB (NodeB, NodeB) in WCDMA (Wideband Code Division Multiple Access, Wideband Code Division Multiple Access); or may further be an eNB or eNodeB (E-UTRAN Node B, E-UTRAN NodeB) in LTE (Long Term Evolution, Long Term Evolution), a relay station or an access point, an in-vehicle device, a wearable device, or a base station device in a future 5G network, or the like.

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

FIG. 1 is a schematic diagram of a communications system in which an information transmission method in the present invention is used. As shown in FIG. 1, the communications system 100 includes a base station 102, and the base station 102 may include multiple antenna groups. Each antenna group may include one or more antennas. For example, one antenna group may include antennas 104 and 106, another antenna group may include antennas 108 and 110, and an additional group may include antennas 112 and 114. In FIG. 1, two antennas are shown for each antenna group. However, more or less antennas may be used for each group. The base station 102 may additionally include a transmitter chain and a receiver chain. A person of ordinary skill in the art may understand that both the transmitter chain and the receiver chain may include multiple components related to signal sending and receiving (for example, a processor, a modulator, a multiplexer, a demodulator, a demultiplexer, or an antenna).

The base station 102 may communicate with multiple user equipments (for example, user equipment 116 and user equipment 122). However, it may be understood that the base station 102 may communicate with any quantity of user equipments that are similar to the user equipment 116 or 122. The user equipments 116 and 122 may be, for example, a cellular phone, a smartphone, a portable computer, a hand-held communications device, a hand-held computing device, a satellite radio apparatus, a global positioning system, a PDA, and/or any other applicable device that is used for communication in the wireless communications system 100.

As shown in FIG. 1, the user equipment 116 communicates with the antennas 112 and 114. The antennas 112 and 114 send information to the user equipment 116 by using a forward link 118, and receive information from the user equipment 116 by using a reverse link 120. In addition, the user equipment 122 communicates with the antennas 104 and 106. The antennas 104 and 106 send information to the user equipment 122 by using a forward link 124, and receive information from the user equipment 122 by using a reverse link 126.

For example, in a frequency division duplex (FDD, Frequency Division Duplex) system, for example, the forward link 118 may use a frequency band different from that used by the reverse link 120, and the forward link 124 may use a frequency band different from that used by the reverse link 126.

For another example, in a time division duplex (TDD, Time Division Duplex) system and a full duplex (Full Duplex) system, the forward link 118 and the reverse link 120 may use a common frequency band, and the forward link 124 and the reverse link 126 may use a common frequency band.

Each group of antennas or an area or both that are designed for communication are referred to as a sector of the base station 102. For example, an antenna group may be designed to communicate with user equipment in a sector of an area covered by the base station 102. In a process in which the base station 102 communicates with the user equipments 116 and 122 by using the forward links 118 and 124 respectively, a transmit antenna of the base station 102 may improve signal-to-noise ratios of the forward links 118 and 124 by means of beamforming. In addition, in comparison with a manner of sending, by a base station, a signal to all user equipments of the base station by using a single antenna, when the base station 102 sends, by means of beamforming, a signal to the user equipments 116 and 122 that are randomly dispersed in a related coverage area, a mobile device in a neighboring cell suffers relatively weak interference.

In a given time, the base station 102, the user equipment 116, or the user equipment 122 may be a wireless communication sending apparatus and/or a wireless communication receiving apparatus. When sending data, the wireless communication sending apparatus may encode the data for transmission. Specifically, the wireless communication sending apparatus may obtain (for example, by means of generation, by receiving from another communications apparatus, or by saving in a memory) a specific quantity of data bits that are to be sent to the wireless communication receiving apparatus by using a channel. This type of data bits may be included in a transport block (or multiple transport blocks) of data, and the transport block may be segmented to generate multiple code blocks.

It should be noted that, in the communications system 100 in which the information transmission method and apparatus in the embodiments of the present invention are used, multiple terminal devices may reuse a same time-frequency resource to perform data transmission with a base station. In addition, as the foregoing same time-frequency resource, for example, in a manner of dividing time-frequency resources in a unit of a resource element (RE, Resource Element), the foregoing time-frequency resource may be a time-frequency resource block (which may also be referred to as a time-frequency resource group) that includes multiple REs. In addition, the multiple REs may have a same time domain location (that is, be corresponding to a same symbol) and different frequency domain locations (that is, be corresponding to different subcarriers), or may have different time domain locations (that is, be corresponding to different symbols) and a same frequency domain location (that is, be corresponding to a same subcarrier), which is not limited particularly in the present invention.

As an example of the foregoing communications system 100, a sparse code multiple access (SCMA, Sparse Code Multiple Access) system may be illustrated. In this system, multiple users reuse a same time-frequency resource block for data transmission. Each resource block includes several resource REs. The RE herein may be a subcarrier-symbol unit in an OFDM technology, or may be a resource element in a time domain or a frequency domain in another air interface technology. For example, in an SCMA system that includes K UEs, available resources are divided into several orthogonal time-frequency resource blocks, and each resource block includes L REs. The L REs may have a same time domain location. When UE#k sends data, to-be-sent data is first divided into data blocks with a size of S bits, and each data block is mapped into one group of modulation symbols $X\#k=\{X\#k_1, X\#k_2, \ldots, X\#k_L\}$ by searching a codebook (which is determined and delivered by a base station to the UE), where each modulation symbol is corresponding to one RE in a resource block, and then, a signal waveform is generated according to a modulation symbol. For the data blocks with a size of S bits, each codebook includes 2S different modulation symbol groups that are corresponding to 2S possible data blocks.

In addition, in the SCMA, in a group of modulation symbols $X\#k=\{X\#k_1, X\#k_2, \ldots, X\#k_L\}$ corresponding to each terminal device, at least one symbol is a zero symbol, and at least one symbol is a non-zero symbol. That is, for data of a terminal device, in L REs, only some REs (at least one RE) carry the data of the terminal device.

It should be understood that the foregoing illustrated SCMA system is merely an example of a communications system to which the information transmission method, apparatus, and device in the present invention are applicable, and the present invention is not limited thereto. Any communications system that is related to performing data transmission by a transmit end device and a receive end device according to a transmission status falls into the protection scope of the present invention.

For ease of understanding and description, in the following embodiments, unless otherwise specified, application in the SCMA system is used as an example to describe an information transmission method in the embodiments of the present invention.

In addition, because multiple user equipments reuse a same time-frequency resource for transmission with a base station in an SCMA system, the base station may perform data transmission with the multiple user equipments at a same moment. Because processes in which the base station performs data transmission with the user equipments are similar, for ease of understanding and description, the following provides description by using a process in which the base station performs data transmission with UE#1 (that is, an example of first user equipment) in the multiple UEs as an example.

FIG. 2 shows a schematic flowchart of an information transmission method 200, described from the perspective of a receive end device, according to an embodiment of the present invention. As shown in FIG. 2, the method 200 includes the following steps:

S210: The receive end device receives, in a first time period, a first symbol sequence sent by a transmit end device.

S220: Determine a first modulation parameter set according to the first symbol sequence, where the first modulation parameter set is a modulation parameter set used when the transmit end device performs modulation processing to generate the first symbol sequence, the first transmission status belongs to the N transmission statuses, and the modulation parameter set includes at least one of the following: a constellation point set or a codebook.

S230: Determine, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the second time period is later than the first time period, and N≥2.

In this embodiment of the present invention, the method 200 may be applied to uplink transmission, that is, the transmit end device may be a terminal device, and the receive end device may be a network device (for example, a base station). Alternatively, the method 200 may be applied to downlink transmission, that is, the transmit end device may be a base station, and the receive end device may be user equipment, which is not limited particularly in the present invention. For ease of understanding and description, the following provides detailed description of the method 200 by using a process in which the method 200 is applied to uplink transmission as an example.

Specifically, UE#1 may determine to generate an information bit that needs to be sent to a base station. This process may be similar to that in the prior art. To avoid repetition, detailed description is omitted herein.

In addition, the UE#1 may perform, based on a pre-stored modulation parameter set, modulation processing on the foregoing information bit, to generate a modulation symbol (that is, the first symbol sequence). In this embodiment of the present invention, multiple (N) modulation parameter sets may be pre-stored for the UE#1 to select.

In this embodiment of the present invention, the modulation parameter set may be a constellation point set or may be a codebook, is not limited particularly in the present invention, and may be selected according to a transmission manner used in an applied communications system.

For example, when the method is applied to a single-user transmission scenario, a constellation point set may be selected as the modulation parameter set.

For another example, when the method is applied to a multi-user transmission scenario (for example, applied to an SCMA system), a codebook may be selected as the modulation parameter set. A code word is a mapping relationship from an information bit to a transmission symbol. The codebook is a set of a code word, that is, a set of the foregoing mapping relationship.

That is, optionally, the modulation parameter set includes a codebook, the codebook is a set of a code word, and the code word is used to indicate the mapping relationship between an information bit and a modulation symbol.

Optionally, the code word is a sparse code multiple access SCMA code word, and the codebook is an SCMA codebook.

In addition, a method and a process of performing modulation processing based on a constellation point set or a codebook may be the same as those in the prior art. To avoid repetition, detailed description is omitted herein.

Figure 3:
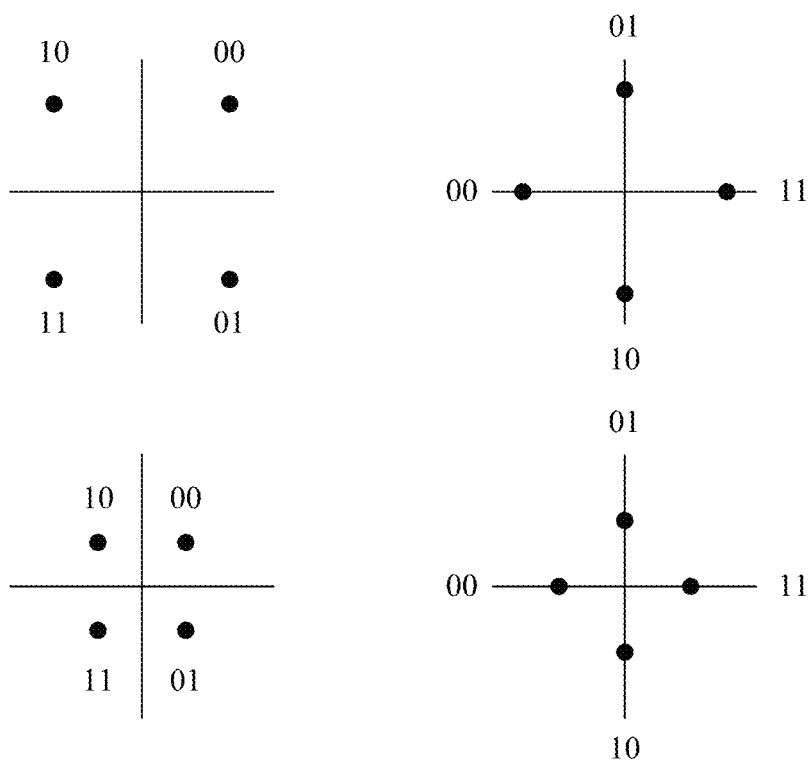
FIG. 3 is a schematic diagram of a modulation parameter set according to an embodiment of the present invention.

FIG. 3 shows a schematic diagram of alternative modulation parameter sets in an embodiment of the present invention. As shown in FIG. 3, the N modulation parameter sets may include a constellation point set S1, a constellation point set S2, and a constellation point set S3. In addition, the foregoing constellation point sets may be obtained by means of a phase change (for example, phase rotation), or may be obtained by means of an amplitude change, or may be obtained by means of both a phase change and an amplitude change, which is not limited particularly in the present invention.

In addition, in this embodiment of the present invention, the N modulation parameter sets may be in a one-to-one correspondence with the N transmission statuses (or may be referred to as user statuses).

Optionally, the transmission statuses include at least one of the following states:

a small-sized packet transmission state, a common transmission state, or a large-throughput transmission state.

Specifically, the small-sized packet transmission state means that a sent data packet of a service is relatively small (for example, with a size smaller than 1 kb), for example, a word information transmission service.

The common transmission state means that a sent data packet of a service is within a normal range (for example, with a size between 1 kb and 1 Mb), for example, picture transmission, or web page browsing.

The large-throughput transmission state means that a sent data packet of a service is relatively large (for example, with a size larger than 1 Mb), for example, a video access service or an online game service.

Table 1 in the following shows entries (that is, an example of the first mapping relationship information) that indicate a correspondence between the foregoing N modulation parameter sets (constellation point sets are used as an example) and the N transmission statuses.

TABLE 1

| Transmission status | Constellation point set |
|---|---|
| Small-sized packet transmission state | S1 |
| Common transmission state | S2 |
| Large-throughput transmission state | S3 |

It should be understood that the modulation parameter sets corresponding to all the illustrated transmission states are merely for exemplary description, and the present invention is not limited thereto. When mapping relationships between a determined transmission status and a determined modulation parameter set are consistent on a transmit end and on a receive end, and on the premise that one modulation parameter set is uniquely corresponding to one transmission status, modulation parameter sets corresponding to all the transmission statuses may be randomly changed.

In addition, the foregoing illustrates a case in which there are three transmission statuses, but the present invention is not limited thereto. Alternatively, any quantity of the foregoing statuses may be included. In addition, another status may be introduced, for example, a non-access state (or a non-transmit state). The non-access state means that no data or information needs to be transmitted on the transmit end. In addition, in the non-access state, the transmit end does not send data to the receive end, and therefore, performing modulation and demodulation by using a constellation point is not involved. Therefore, the non-access state may be not corresponding to any modulation parameter set.

Similarly, the base station may also obtain the first mapping relationship information by using a similar method and procedure.

After the first mapping relationship information is obtained above, the UE#1 may determine a transmission status of the UE#1 in the second time period. In the following, for ease of understanding and description, the transmission status is marked as a transmission status #A. For example, the UE#1 may determine the transmission status #A according to a service accessed in the second time period. For example, if the service accessed in the second time period is a service related to word transmission, such as web page browsing or chatting, it may be determined that the transmission status #A is a small-sized packet transmission state. If the service accessed in the second time period is an online game service or a video download service, it may be determined that the transmission status #A is a large-throughput transmission state.

It should be noted that the foregoing second time period refers to a future time period, that is, duration from a start point of the second time period to a current moment is greater than a preset threshold, and the threshold may be determined according to duration required for completing one data transmission between the transmit end device and the receive end device, to ensure that the receive end device can learn, before the second time period, the transmission status of the transmit end device in the second time period.

After determining the transmission status #A, the UE#1 may determine, based on the foregoing first mapping relationship information (for example, Table 1), a modulation parameter set corresponding to the transmission status #A. In the following, for ease of understanding and description, the modulation parameter set is marked as a modulation parameter set #A.

Therefore, the UE#1 may perform modulation processing on the foregoing information bit according to the modulation parameter set #A, to generate the first symbol sequence. In addition, the foregoing modulation processing method and process may be similar to those in the prior art. To avoid repetition, detailed description is omitted herein.

Then, the UE#1 may send the foregoing first symbol sequence to the base station in a time period (that is, the first time period, for example, may include a current moment T) that is earlier than the foregoing second time period.

In this embodiment of the present invention, the UE#1 may determine whether transmission performed in the first time period is continuous transmission, and select a transmission parameter according to a determining result, to send the foregoing first symbol sequence to the base station.

As the foregoing determining method, for example, the UE#1 may determine whether the UE#1 transmits data to the base station before the first time period (within a specified duration range). If the UE#1 transmits data to the base station, a transmission parameter used in previous transmission may be still used. If the UE#1 does not transmit data to the base station, a preset default transmission parameter (that is, an example of a first transmission parameter set) is used.

That is, optionally, transmitting the first symbol sequence to the receive end device in the first time period includes:

when it is determined that no information is transmitted between the transmit end device and the receive end device within a first preset duration range earlier than the first time period, transmitting the first symbol sequence to the receive end device according to the preset first transmission parameter set.

According to the information transmission method in this embodiment of the present invention, before the first symbol sequence is transmitted to the receive end device in the first time period, whether information is transmitted between the transmit end device and the receive end device within the first preset duration range earlier than the first time period is determined, so that transmission parameters selected by the transmit end device and the receive end device can be consistent and transmission reliability is further improved.

After the UE#1 sends the first symbol sequence in the first time period, correspondingly, the base station may receive the first symbol sequence. It should be noted that a moment at which the base station receives the first symbol sequence is earlier than the second time period.

Likewise, the base station may determine whether transmission performed in the first time period is continuous transmission, and select a transmission parameter according to a determining result, to receive the foregoing first symbol sequence sent by the UE#1.

As the foregoing determining method, for example, the base station may determine whether the base station transmits data to the UE#1 before the first time period (within a specified duration range). If the base station transmits data to the UE#1, a transmission parameter used in previous transmission may be still used. If the base station does not transmit data to the UE#1, a preset default transmission parameter (that is, an example of the first transmission parameter set) is used. In addition, in this embodiment of the present invention, a process of receiving a modulation symbol by using a transmission parameter may be similar to that in the prior art. To avoid repetition, detailed description is omitted.

After receiving the foregoing first symbol sequence, the base station may determine the modulation parameter set used when the UE#1 performs modulation processing to generate the first symbol sequence.

As a determining method, the following processes may be illustrated.

Optionally, the determining a first modulation parameter set according to the first symbol sequence includes:

intercepting a symbol subsequence from the first symbol sequence, where the symbol subsequence includes at least two symbols; and determining the first modulation parameter set according to the symbol subsequence.

Specifically, first, the base station may intercept a segment of symbol subsequence (which includes at least two symbols) from the first symbol sequence.

Optionally, the symbol subsequence is the first K symbols in the first symbol sequence, where K is a preset value, and K≥2; or the symbol subsequence includes symbols in the first symbol sequence that are received when quality of a channel between the receive end device and the network device meets a preset condition.

Specifically, the symbol subsequence may be multiple symbols that are first received, or may be multiple symbols that are received when a channel environment is relatively good.

Then, the base station may separately perform decoding on the foregoing N modulation parameter sets (for example, including the foregoing S1, S2, and S3) by using an information transfer algorithm, and obtain log-likelihood ratio (LLR, log-Likelihood Rate) values of all symbols in the foregoing symbol subsequence.

Finally, absolute values of the LLR values that are of all the symbols and that are obtained based on the foregoing N modulation parameter sets may be first obtained separately, and then are summed to obtain sums of the LLR values corresponding to the N modulation parameter sets, and a modulation parameter set with a largest sum of corresponding LLR values is determined as the modulation parameter set, that is, the modulation parameter set #A, used when the UE#1 performs modulation processing to generate the first symbol sequence.

It should be understood that the foregoing illustrated method and process of determining, by the receive end device, a modulation parameter set used by the transmit end device to perform modulation processing are merely for exemplary description, and the present invention is not limited thereto. For example, an entire sequence of the first symbol sequence may also be used as the foregoing symbol subsequence to perform the foregoing determining process.

Then, the base station may determine, according to the foregoing first mapping relationship information, the transmission status corresponding to the modulation parameter set #A, that is, the transmission status #A, and determine the transmission status #A as the transmission status of the UE#1 in the second time period.

Optionally, the method further includes:

determining, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

Specifically, in this embodiment of the present invention, for different transmission statuses, the transmit end device and the receive end device may use different transmission technologies, or transmission parameter sets. The transmission parameter sets may include the following parameters, for example, the frame structure, the retransmission policy, and the Modulation and coding scheme. Therefore, the foregoing various air interface transmission technologies can be flexibly used, communication quality is enhanced, and user experience is improved.

As an example but not a limitation, in this embodiment of the present invention, for different transmission statuses, the following transmission technologies may be used.

A. For a small-sized packet transmission state:

When the transmission statuses include the small-sized packet transmission state, in a transmission parameter set corresponding to the small-sized packet transmission state:

if the transmission parameter includes a frame structure, the frame structure is a frame structure with a frame length less than 1 ms;

if the transmission parameter includes a retransmission policy, the retransmission policy is fast retransmission; or if the transmission parameter includes a Modulation and coding scheme, the Modulation and coding scheme is a multi-element low-density parity-check code or a polar code.

Specifically, because a data packet transmitted in the small-sized packet transmission state is relatively small (smaller than 1 kb), a frame structure with a relatively small frame length can meet a transmission requirement, can improve a transmission rate, reduce power consumption of both the receive end device and the transmit end device, and reduce system resource overheads.

Because a data packet transmitted in the small-sized packet transmission state is relatively small (smaller than 1 kb), setting the retransmission policy to the fast retransmission can improve a transmission rate, reduce power consumption of both the receive end device and the transmit end device, and reduce system resource overheads.

Because a data packet transmitted in the small-sized packet transmission state is relatively small (smaller than 1 kb), using a modulation and coding scheme in which optimization is performed particularly for a packet with a small length by using the multi-element low-density parity-check code, the polar code, or the like can improve a transmission rate, and reduce a bit error probability detected by at a receive end.

It should be understood that the foregoing illustrated transmission parameters corresponding to the small-sized packet transmission state are merely for exemplary description, and the present invention is not limited thereto. All transmission parameters that can take effect in the small-sized packet transmission state fall into the protection scope of the present invention.

B. For a large-throughput transmission state:

When the transmission statuses include the large-throughput transmission state, in a transmission parameter set corresponding to the large-throughput transmission state:

if the transmission parameter includes a frame structure, the frame structure is a frame structure with a frame length greater than 1 ms;

if the transmission parameter includes a retransmission policy, the retransmission policy is rateless transmission; or if the transmission parameter includes a Modulation and coding scheme, the Modulation and coding scheme is a low-density parity-check code.

Specifically, because a data packet transmitted in the large-throughput transmission state is relatively large (larger than 1 Mb), using a frame structure with a relatively long frame can reduce a proportion of resources occupied by control signaling, thereby improving a transmission rate and reducing power consumption of both the receive end device and the transmit end device.

Because a data packet transmitted in the large-throughput transmission state is relatively large (larger than 1 Mb), setting the retransmission policy to the rateless retransmission can substantially reduce a quantity of system feedbacks, thereby improving a transmission rate and reducing system resource overheads.

Because a data packet transmitted in the large-throughput transmission state is relatively large (larger than 1 Mb), using a modulation and coding scheme, such as the low-density parity-check code, that is applicable to transmission of a long code block can implement a good balance between complexity and system bit error performance, thereby improving a transmission rate and reducing power consumption of both the receive end device and the transmit end device.

It should be understood that the foregoing illustrated transmission parameters corresponding to the large-throughput transmission state are merely for exemplary description, and the present invention is not limited thereto. All transmission parameters that can take effect in the large-throughput transmission state fall into the protection scope of the present invention.

C. For a common transmission state:

When the transmission statuses include the common transmission state, in a transmission parameter set corresponding to the common transmission state:

if the transmission parameter includes a frame structure, the frame structure is a frame structure with a frame length equal to 1 ms;

if the transmission parameter includes a retransmission policy, the retransmission policy is standard retransmission; or if the transmission parameter includes a Modulation and coding scheme, the Modulation and coding scheme is a low-density parity-check code or a turbo code Turbo code.

It should be understood that the foregoing illustrated transmission parameters corresponding to the common transmission state are merely for exemplary description, and the present invention is not limited thereto. All transmission parameters that can take effect in the common transmission state fall into the protection scope of the present invention.

In addition, the foregoing illustrated specific physical parameters included in the transmission parameter set are merely for exemplary description, and the present invention is not limited thereto. For example, the transmission parameter set may further include a transmit waveform.

When the transmission statuses include the small-sized packet transmission state, in the transmission parameter set corresponding to the small-sized packet transmission state: if the transmission parameter includes a transmit waveform, the transmit waveform is a filter-orthogonal frequency division multiplexing F-OFDM waveform or an orthogonal frequency division multiplexing OFDM waveform.

When the transmission statuses include the large-throughput transmission state, in the transmission parameter set corresponding to the large-throughput transmission state: if the transmission parameter includes a transmit waveform, the transmit waveform is a carrier aggregation waveform.

When the transmission statuses include the common transmission state, in the transmission parameter set corresponding to the common transmission state: if the transmission parameter includes a transmit waveform, the transmit waveform is an OFDM waveform.

Specifically, small-sized packet transmission occupies relatively few spectrum resources, and therefore, a waveform, such as the F-OFDM waveform, that occupies low bandwidth and has little leakage on a spectrum sideband needs to be selected.

For large-throughput transmission, a large quantity of spectrum resources need to be aggregated for simultaneous transmission, and therefore, a spectrum aggregation waveform needs to be considered for use, to aggregate multiple frequency bands.

Table 2 in the following shows entries (that is, an example of the second mapping relationship information) that are used to indicate a correspondence between the foregoing N transmission statuses and the N transmission parameter sets.

TABLE 2

| Transmission status | Transmit waveform | Frame structure | Retransmission technology | Code modulation technology |
|---|---|---|---|---|
| Small-sized packet transmission | Filter-orthogonal frequency division multiplexing waveform or orthogonal frequency division multiplexing waveform | Frame length < 1 ms | Fast retransmission | Multi-element low-density parity-check code or polar code |
| Common transmission | Orthogonal frequency division multiplexing waveform | Frame length = 1 ms | Standard retransmission | Low-density parity-check code or Turbo code |
| Large-throughput transmission | Carrier aggregation waveform | Frame length > 1 ms | Rateless retransmission | Low-density parity-check code |

It should be understood that, in this embodiment of the present invention, any quantity of transmission parameters may be included in a transmission parameter set, which is not limited particularly in the present invention.

In addition, the foregoing illustrates a case in which there are three transmission statuses, but the present invention is not limited thereto. Alternatively, any quantity of the foregoing statuses may be included. In addition, another status may be introduced, for example, a non-access state (or a non-transmit state). The non-access state means that no data or information needs to be transmitted on the transmit end. In addition, in the non-access state, the transmit end does not send data to the receive end, and therefore, using a transmission parameter is not involved. Therefore, the non-access state may be not corresponding to any transmission parameter set.

Similarly, the base station may also obtain the second mapping relationship information by using a similar method and procedure.

Therefore, the base station may determine, according to the foregoing second mapping relationship information, a transmission parameter set corresponding to the transmission status #A. In the following, for ease of understanding, the transmission parameter set is marked as a transmission parameter set #A.

Optionally, the method further includes:

receiving, in the second time period according to the second transmission parameter set, a second symbol sequence transmitted by the transmit end device.

Specifically, during processing by the UE#1, after the UE#1 determines that the second time period starts, the UE#1 may perform modulation processing on data that needs to be sent to the base station, to generate the second symbol sequence, and send the second symbol sequence to the base station by using the transmission parameter set #A.

Optionally, transmitting the second symbol sequence to the receive end device in the second time period according to the second transmission parameter set includes:

determining a second transmission status, where the second transmission status is a transmission status of the transmit end device in a third time period, and the third time period is later than the second time period;

determining, from the N modulation parameter sets according to the first mapping relationship information, a second modulation parameter set corresponding to the second transmission status;

performing modulation processing according to the second modulation parameter set, to generate the second symbol sequence; and transmitting the second symbol sequence to the receive end device in the second time period according to the second transmission parameter set.

That is, the second symbol sequence is symbols generated after modulation processing is performed based on the second modulation parameter set, the second modulation parameter set is corresponding to the second transmission status, the second transmission status is the transmission status of the transmit end device in the third time period, and the third time period is later than the second time period.

Specifically, when performing modulation processing to generate the second symbol sequence, the UE#1 may determine a transmission status in the third time period (later than the second time period). In the following, for ease of understanding and description, the transmission status is marked as a transmission status #B. In addition, a modulation parameter set corresponding to the transmission status #B is determined according to the foregoing first mapping relationship information. In the following, for ease of understanding and description, the modulation parameter set is marked as a modulation parameter set #B.

Therefore, the foregoing modulation processing may be performed according to the modulation parameter set #B to generate the second symbol sequence.

Correspondingly, the base station may receive the foregoing second symbol sequence according to the foregoing determined transmission parameter set #A, and may determine a modulation parameter set, that is, the modulation parameter set #B, that is used when the UE#1 performs modulation processing to generate the second symbol sequence. The base station further determines a transmission parameter set corresponding to the modulation parameter set #B. In the following, for ease of understanding and description, the transmission parameter set is marked as a transmission parameter set #B.

Therefore, the UE#1 and the base station may transmit information in the third time period according to the transmission parameter set #B.

It should be understood that, a case in which the first mapping relationship information and the second mapping relationship information are recorded in two entries is merely for exemplary description, and the present invention is not limited thereto. Alternatively, mapping relationships among a modulation parameter set, a transmission status, and a transmission parameter set may be recorded in a same entry.

In this embodiment of the present invention, a transmission status may also be referred to as a user status that is determined according to a status (for example, a service accessed by user equipment) of the user equipment. Therefore, performing communication according to the transmission status can enable communication to meet a requirement of the user equipment, thereby improving user experience and improving communication flexibility.

According to the information transmission method in this embodiment of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

FIG. 4 shows a schematic flowchart of an information transmission method 300, described from the perspective of a transmit end device, according to an embodiment of the present invention. As shown in FIG. 4, the method 300 includes the following steps:

S310: Determine a first transmission status, where the first transmission status is a transmission status of the transmit end device in a second time period.

S320: Determine, according to preset first mapping relationship information, a first modulation parameter set corresponding to the first transmission status, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the modulation parameter set includes at least one of the following: a constellation point set or a codebook, and N≥2.

S330: Perform modulation processing according to the first modulation parameter set to generate a first symbol sequence, and transmit the first symbol sequence to a receive end device in a first time period, where the second time period is later than the first time period.

Optionally, the method further includes:
determining, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

Optionally, the method further includes:
transmitting the second symbol sequence to the receive end device in the second time period according to the second transmission parameter set.

Optionally, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

Optionally, the transmitting the first symbol sequence to a receive end device in a first time period includes:
when it is determined that no information is transmitted between the transmit end device and the receive end device within a first preset duration range earlier than the first time period, transmitting the first symbol sequence to the receive end device according to a preset first transmission parameter set, where the first transmission parameter set includes at least one of the following transmission parameters: a frame structure, a retransmission policy, or a Modulation and coding scheme.

Optionally, the N transmission statuses include at least one of the following states:
a small-sized packet transmission state, a common transmission state, or a large-throughput transmission state.

Optionally, when the N transmission statuses include the small-sized packet transmission state, in a transmission parameter set corresponding to the small-sized packet transmission state:
if the transmission parameter includes a frame structure, the frame structure is a frame structure with a frame length less than 1 ms;
if the transmission parameter includes a retransmission policy, the retransmission policy is fast retransmission; or
if the transmission parameter includes a Modulation and coding scheme, the Modulation and coding scheme is a multi-element low-density parity-check code or a polar code.

Optionally, when the N transmission statuses include the large-throughput transmission state, in a transmission parameter set corresponding to the large-throughput transmission state:
if the transmission parameter includes a frame structure, the frame structure is a frame structure with a frame length greater than 1 ms;
if the transmission parameter includes a retransmission policy, the retransmission policy is rateless transmission; or
if the transmission parameter includes a Modulation and coding scheme, the Modulation and coding scheme is a low-density parity-check code.

Optionally, when the N transmission statuses include the common transmission state, in a transmission parameter set corresponding to the common transmission state:
if the transmission parameter includes a frame structure, the frame structure is a frame structure with a frame length equal to 1 ms;
if the transmission parameter includes a retransmission policy, the retransmission policy is standard retransmission; or
if the transmission parameter includes a Modulation and coding scheme, the Modulation and coding scheme is a low-density parity-check code or a Turbo code.

Optionally, the modulation parameter set includes a codebook, the codebook is a set of a code word, and the code word is used to indicate a mapping relationship between an information bit and a modulation symbol.

Optionally, the code word is a sparse code multiple access SCMA code word, and the codebook is an SCMA codebook.

In the method 300, actions of the transmit end device are similar to actions of the UE#1 in the foregoing method 200, and actions of the receive end device are similar to actions of the base station in the foregoing method 200. To avoid repetition, detailed description is omitted herein.

In this embodiment of the present invention, a transmission status may also be referred to as a user status that is determined according to a status (for example, a service accessed by user equipment) of the user equipment. Therefore, performing communication according to the transmission status can enable communication to meet a requirement of the user equipment, thereby improving user experience and improving communication flexibility.

According to the information transmission method in this embodiment of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

The foregoing provides detailed description of the information transmission method according to the embodiments of the present invention with reference to FIG. 1 to FIG. 4. The following provides detailed description of information transmission apparatuses according to the embodiments of the present invention with reference to FIG. 5 and FIG. 6.

Figure 5:
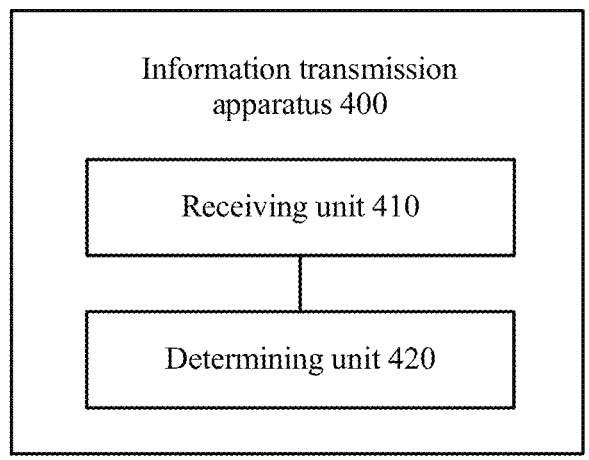
FIG. 5 is a schematic structural diagram of an information transmission apparatus according to an embodiment of the present invention.

FIG. 5 shows a schematic block diagram of an information transmission apparatus 400 according to an embodiment of the present invention. As shown in FIG. 5, the apparatus 400 includes:

a receiving unit 410, configured to receive, in a first time period, a first symbol sequence sent by a transmit end device; and a determining unit 420, configured to: determine a first modulation parameter set according to the first symbol sequence, where the first modulation parameter set is a modulation parameter set used when the transmit end device performs modulation processing to generate the first symbol sequence, and the modulation parameter set includes at least one of the following: a constellation point set or a codebook; and determine, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and N≥2.

Optionally, the determining unit is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

Optionally, the receiving unit is further configured to receive, in the second time period according to the second transmission parameter set, a second symbol sequence transmitted by the transmit end device.

Optionally, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

Optionally, the receiving unit is specifically configured to: when it is determined that no information is transmitted between the transmit end device and the receive end device within a first preset duration range earlier than the first time period, receive, by the receive end device in the first time period according to a preset first transmission parameter set, the first symbol sequence sent by the transmit end device, where the first transmission parameter set includes at least one of the following transmission parameters: a frame structure, a retransmission policy, or a Modulation and coding scheme.

Optionally, the determining unit is specifically configured to: intercept a symbol subsequence from the first symbol sequence, where the symbol subsequence includes at least two symbols; and determine the first modulation parameter set according to the symbol subsequence.

Optionally, the symbol subsequence is the first K symbols in the first symbol sequence, where K is a preset value, and K≥2; or the symbol subsequence includes symbols in the first symbol sequence that are received when quality of a channel between the receive end device and the network device meets a preset condition.

Optionally, the N transmission statuses include at least one of the following states:

a small-sized packet transmission state, a common transmission state, or a large-throughput transmission state.

Optionally, when the N transmission statuses include the small-sized packet transmission state, in a transmission parameter set corresponding to the small-sized packet transmission state:

if the transmission parameter includes a frame structure, the frame structure is a frame structure with a frame length less than 1 ms;

if the transmission parameter includes a retransmission policy, the retransmission policy is fast retransmission; or if the transmission parameter includes a Modulation and coding scheme, the Modulation and coding scheme is a multi-element low-density parity-check code or a polar code.

Optionally, when the N transmission statuses include the large-throughput transmission state, in a transmission parameter set corresponding to the large-throughput transmission state:

if the transmission parameter includes a frame structure, the frame structure is a frame structure with a frame length greater than 1 ms;

if the transmission parameter includes a retransmission policy, the retransmission policy is rateless transmission; or if the transmission parameter includes a Modulation and coding scheme, the Modulation and coding scheme is a low-density parity-check code.

Optionally, when the N transmission statuses include the common transmission state, in a transmission parameter set corresponding to the common transmission state:

if the transmission parameter includes a frame structure, the frame structure is a frame structure with a frame length equal to 1 ms;

if the transmission parameter includes a retransmission policy, the retransmission policy is standard retransmission; or if the transmission parameter includes a Modulation and coding scheme, the Modulation and coding scheme is a low-density parity-check code or a Turbo code.

Optionally, the modulation parameter set includes a codebook, the codebook is a set of a code word, and the code word is used to indicate a mapping relationship between an information bit and a modulation symbol.

Optionally, the code word is a sparse code multiple access SCMA code word, and the codebook is an SCMA codebook.

Optionally, the apparatus is the receive end device, and the receive end device is a network device.

The information transmission apparatus 400 according to this embodiment of the present invention may be corresponding to a receive end device (for example, a base station) in the method in the embodiments of the present invention. In addition, all units or modules, and the foregoing other operations and/or functions of the information transmission apparatus 400 are separately for implementing corresponding procedures of the method 200 in FIG. 2. For brevity, details are not described herein.

According to the information transmission apparatus in this embodiment of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

Figure 6:
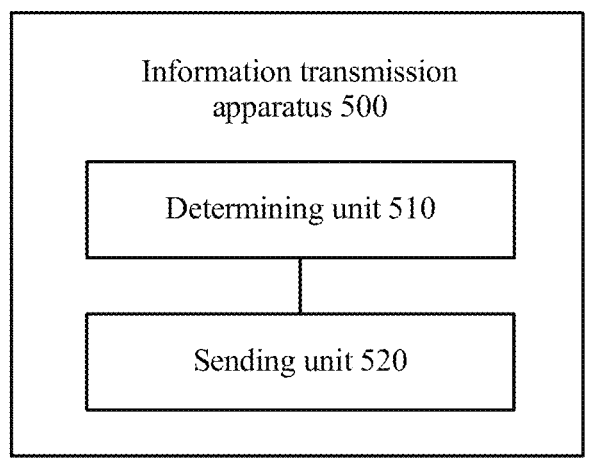
FIG. 6 is a schematic structural diagram of an information transmission apparatus according to another embodiment of the present invention.

FIG. 6 shows a schematic block diagram of an information transmission apparatus 500 according to an embodiment of the present invention. As shown in FIG. 6, the apparatus 500 includes:

a determining unit 510, configured to: determine a first transmission status, where the first transmission status is a transmission status of the transmit end device in a second time period; and determine, according to preset first mapping relationship information, a first modulation parameter set corresponding to the first transmission status, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, N≥2, and the modulation parameter set includes at least one of the following: a constellation point set or a codebook; and a sending unit 520, configured to perform modulation processing according to the first modulation parameter set to generate a first symbol sequence, and transmit the first symbol sequence to a receive end device in a first time period, where the second time period is later than the first time period.

Optionally, the determining unit is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

Optionally, the sending unit is further configured to transmit a second symbol sequence to the receive end device in the second time period according to the second transmission parameter set.

Optionally, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

Optionally, the sending unit is specifically configured to: when it is determined that no information is transmitted between the transmit end device and the receive end device within a first preset duration range earlier than the first time period, transmit the first symbol sequence to the receive end device according to a preset first transmission parameter set, where the first transmission parameter set includes at least one of the following transmission parameters: a frame structure, a retransmission policy, or a Modulation and coding scheme.

Optionally, the N transmission statuses include at least one of the following states:

a small-sized packet transmission state, a common transmission state, or a large-throughput transmission state.

Optionally, when the N transmission statuses include the small-sized packet transmission state, in a transmission parameter set corresponding to the small-sized packet transmission state:

if the transmission parameter includes a frame structure, the frame structure is a frame structure with a frame length less than 1 ms;

if the transmission parameter includes a retransmission policy, the retransmission policy is fast retransmission; or if the transmission parameter includes a Modulation and coding scheme, the Modulation and coding scheme is a multi-element low-density parity-check code or a polar code.

Optionally, when the N transmission statuses include the large-throughput transmission state, in a transmission parameter set corresponding to the large-throughput transmission state:

if the transmission parameter includes a frame structure, the frame structure is a frame structure with a frame length greater than 1 ms;

if the transmission parameter includes a retransmission policy, the retransmission policy is rateless transmission; or if the transmission parameter includes a Modulation and coding scheme, the Modulation and coding scheme is a low-density parity-check code.

Optionally, when the N transmission statuses include the common transmission state, in a transmission parameter set corresponding to the common transmission state:

if the transmission parameter includes a frame structure, the frame structure is a frame structure with a frame length equal to 1 ms;

if the transmission parameter includes a retransmission policy, the retransmission policy is standard retransmission; or if the transmission parameter includes a Modulation and coding scheme, the Modulation and coding scheme is a low-density parity-check code or a Turbo code.

Optionally, the modulation parameter set includes a codebook, the codebook is a set of a code word, and the code word is used to indicate a mapping relationship between an information bit and a modulation symbol.

Optionally, the code word is a sparse code multiple access SCMA code word, and the codebook is an SCMA codebook.

Optionally, the apparatus is the transmit end device, and the transmit end device is a terminal device.

The information transmission apparatus 500 according to this embodiment of the present invention may be corresponding to a transmit end device (for example, UE#1) in the method in the embodiments of the present invention. In addition, all units or modules, and the foregoing other operations and/or functions of the information transmission apparatus 500 are separately for implementing corresponding procedures of the method 300 in FIG. 4. For brevity, details are not described herein.

According to the information transmission apparatus in this embodiment of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

The foregoing provides detailed description of the information transmission method according to the embodiments of the present invention with reference to FIG. 1 to FIG. 4. The following provides detailed description of information transmission devices according to the embodiments of the present invention with reference to FIG. 7 and FIG. 8.

Figure 7:
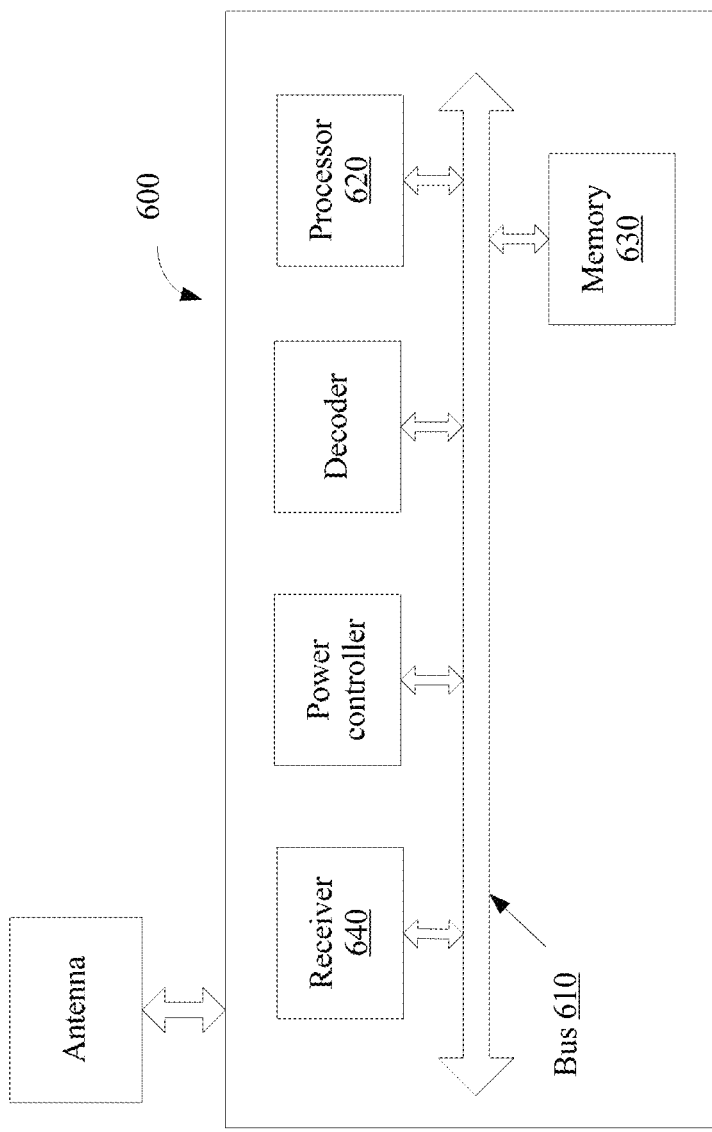
FIG. 7 is a schematic structural diagram of an information transmission device according to an embodiment of the present invention.

FIG. 7 shows a schematic block diagram of an information transmission device 600 according to an embodiment of the present invention. As shown in FIG. 7, the device 600 includes:

a bus 610;

a processor 620 connected to the bus;

a memory 630 connected to the bus; and a receiver 640 connected to the bus, where the processor invokes, by using the bus, a program stored in the memory, to be configured to control the receiver to receive, in a first time period, a first symbol sequence sent by a transmit end device;

configured to determine a first modulation parameter set according to the first symbol sequence, where the first modulation parameter set is a modulation parameter set used when the transmit end device performs modulation processing to generate the first symbol sequence, and the modulation parameter set includes at least one of the following: a constellation point set or a codebook; and configured to determine, according to preset first mapping relationship information, a first transmission status corresponding to the first modulation parameter set as a transmission status of the transmit end device in a second time period, where the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and N≥2.

Optionally, the processor is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

Optionally, the processor is further configured to control the receiver to receive, in the second time period according to the second transmission parameter set, a second symbol sequence transmitted by the transmit end device.

Optionally, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

Optionally, the processor is specifically configured to: when it is determined that no information is transmitted between the transmit end device and the receive end device within a first preset duration range earlier than the first time period, control the receiver to receive, in the first time period according to a preset first transmission parameter set, the first symbol sequence sent by the transmit end device, where the first transmission parameter set includes at least one of the following transmission parameters: a frame structure, a retransmission policy, or a Modulation and coding scheme.

Optionally, the processor is specifically configured to: intercept a symbol subsequence from the first symbol sequence, where the symbol subsequence includes at least two symbols; and determine the first modulation parameter set according to the symbol subsequence.

Optionally, the symbol subsequence is the first K symbols in the first symbol sequence, where K is a preset value, and K≥2; or the symbol subsequence includes symbols in the first symbol sequence that are received when quality of a channel between the receive end device and the network device meets a preset condition.

Optionally, the N transmission statuses include at least one of the following states:

a small-sized packet transmission state, a common transmission state, or a large-throughput transmission state.

Optionally, when the N transmission statuses include the small-sized packet transmission state, in a transmission parameter set corresponding to the small-sized packet transmission state:

if the transmission parameter includes a frame structure, the frame structure is a frame structure with a frame length less than 1 ms;

if the transmission parameter includes a retransmission policy, the retransmission policy is fast retransmission; or if the transmission parameter includes a Modulation and coding scheme, the Modulation and coding scheme is a multi-element low-density parity-check code or a polar code.

Optionally, when the N transmission statuses include the large-throughput transmission state, in a transmission parameter set corresponding to the large-throughput transmission state:

if the transmission parameter includes a frame structure, the frame structure is a frame structure with a frame length greater than 1 ms;

if the transmission parameter includes a retransmission policy, the retransmission policy is rateless transmission; or if the transmission parameter includes a Modulation and coding scheme, the Modulation and coding scheme is a low-density parity-check code.

Optionally, when the N transmission statuses include the common transmission state, in a transmission parameter set corresponding to the common transmission state:

if the transmission parameter includes a frame structure, the frame structure is a frame structure with a frame length equal to 1 ms;

if the transmission parameter includes a retransmission policy, the retransmission policy is standard retransmission; or if the transmission parameter includes a Modulation and coding scheme, the Modulation and coding scheme is a low-density parity-check code or a Turbo code.

This embodiment of the present invention can be applied to various communications devices.

The receiver of the device 600 may include a receiver circuit, a power controller, a decoder, and an antenna. In addition, the device 600 may further include a transmitter, and the transmitter may include a transmitter circuit, a power controller, an encoder, and an antenna.

Optionally, the modulation parameter set includes a codebook, the codebook is a set of a code word, and the code word is used to indicate a mapping relationship between an information bit and a modulation symbol.

Optionally, the code word is a sparse code multiple access SCMA code word, and the codebook is an SCMA codebook.

Optionally, the device is the receive end device, and the receive end device is a network device.

The processor may also be referred to as a CPU. The memory may include a read-only memory and a random access memory, and provide an instruction and data for the processor. A part of the memory may further include a non-volatile random access memory (NVRAM). In specific application, the device 600 may be built in or may be a wireless communications device such as a mobile phone or a network device such as a base station, and may further include a carrier that accommodates a transmitter circuit and a receiver circuit, so as to allow data transmitting and receiving between the device 600 and a remote location. The transmitter circuit and the receiver circuit may be coupled to the antenna. All components of the device 600 may be coupled together by using the bus. The bus further includes a power bus, a control bus, and a status signal bus in addition to a data bus. However, for clear description, all kinds of buses are marked as the bus 610 in the figure. In specific different products, the decoder may be integrated with the processing unit.

The processor may implement or execute all steps and logical block diagrams that are disclosed in the method embodiments of the present invention. A general purpose processor may be a microprocessor, or the processor may be any conventional processor, decoder, or the like. Steps of the method disclosed with reference to this embodiment of the present invention may be directly executed and accomplished by a hardware processor, or may be executed and accomplished by a combination of hardware and a software module in a decoding processor. The software module may be located in a mature storage medium in the field, such as a random access memory, a flash memory, a read-only memory, a programmable read-only memory or an electrically-erasable programmable memory, or a register.

It should be understood that, in this embodiment of the present invention, the processor 620 may be a central processing unit (Central Processing Unit, "CPU" for short), or the processor 620 may be another general purpose processor, a digital signal processor (DSP), an application-specific integrated circuit (ASIC), a field programmable gate array (FPGA) or another programmable logical device, a discrete gate or transistor logic device, a discrete hardware component, or the like. The general purpose processor may be a microprocessor, or the processor may be any conventional processor or the like.

The memory 630 may include a read-only memory and a random access memory, and provide an instruction and data for the processor 620. A part of the memory 630 may further include a non-volatile random access memory. For example, the memory 630 may further store information about a device type.

The bus system 610 may further include a power bus, a control bus, and a status signal bus in addition to a data bus. However, for clear description, all kinds of buses are marked as the bus system 610 in the figure.

In an implementation process, steps of the foregoing method may be performed by an integrated logical circuit in hardware or by an instruction in a form of software in the processor 620. Steps of the method disclosed with reference to this embodiment of the present invention may be directly executed and accomplished by a hardware processor, or may be executed and accomplished by a combination of hardware and a software module in a processor. The software module may be located in a mature storage medium in the field, such as a random access memory, a flash memory, a read-only memory, a programmable read-only memory or an electrically-erasable programmable memory, or a register. The storage medium is located in the memory 630, and the processor 620 reads information from the memory 630 and performs, with reference to hardware thereof, the steps in the foregoing method. To avoid repetition, details are not described herein.

The information transmission device 600 according to this embodiment of the present invention may be corresponding to a receive end device (for example, a base station) in the method in the embodiments of the present invention. In addition, all units or modules, and the foregoing other operations and/or functions of the information transmission device 600 are separately for implementing corresponding procedures of the method 200 in FIG. 2. For brevity, details are not described herein.

According to the information transmission device in this embodiment of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

Figure 8:
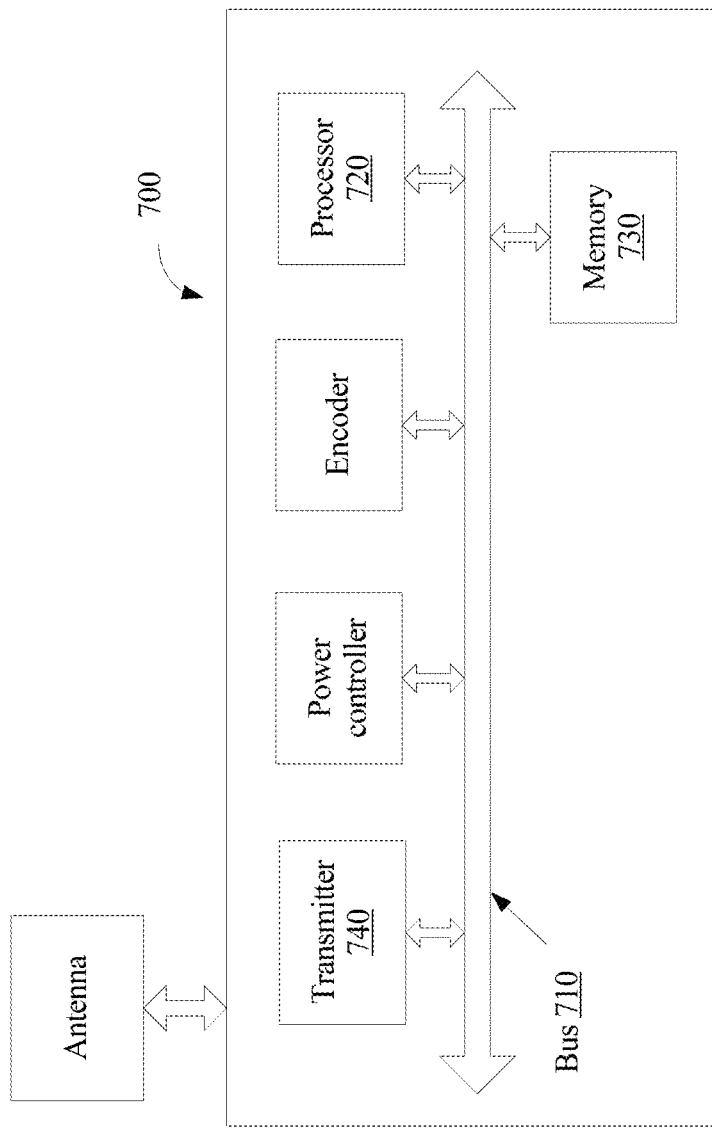
FIG. 8 is a schematic structural diagram of an information transmission device according to another embodiment of the present invention.

FIG. 8 shows a schematic block diagram of an information transmission device 700 according to an embodiment of the present invention. As shown in FIG. 8, the device 700 includes:

a bus 710;

a processor 720 connected to the bus;

a memory 730 connected to the bus; and a transmitter 740 connected to the bus, where the processor invokes, by using the bus, a program stored in the memory, to be configured to determine a first transmission status, where the first transmission status is a transmission status of the transmit end device in a second time period;

configured to determine, according to preset first mapping relationship information, a first modulation parameter set corresponding to the first transmission status, where the first mapping relationship information is used to indicate a one-to-one mapping relationship between N modulation statuses and N modulation parameter sets, the first modulation parameter set belongs to the N modulation parameter sets, the first transmission status belongs to the N transmission statuses, N≥2, and the modulation parameter set includes at least one of the following: a constellation point set or a codebook; and configured to perform modulation processing according to the first modulation parameter set to generate a first symbol sequence, and control the transmitter to transmit the first symbol sequence to a receive end device in a first time period, where the second time period is later than the first time period.

Optionally, the processor is further configured to determine, according to preset second mapping relationship information, a second transmission parameter set corresponding to the first transmission status, where the second mapping relationship information is used to indicate a one-to-one mapping relationship between the N transmission statuses and N transmission parameter sets, the second transmission parameter set belongs to the N transmission parameter sets, and each transmission parameter set includes at least one of the following transmission parameters: a frame structure, a retransmission policy, or a Modulation and coding scheme.

Optionally, the processor is further configured to control the transmitter to transmit a second symbol sequence to the receive end device in the second time period according to the second transmission parameter set.

Optionally, the second symbol sequence is symbols generated after modulation processing is performed based on a second modulation parameter set, the second modulation parameter set is corresponding to a second transmission status, the second transmission status is a transmission status of the transmit end device in a third time period, and the third time period is later than the second time period.

Optionally, the processor is specifically configured to: when it is determined that no information is transmitted between the transmit end device and the receive end device within a first preset duration range earlier than the first time period, control the transmitter to transmit the first symbol sequence to the receive end device according to a preset first transmission parameter set, where the first transmission parameter set includes at least one of the following transmission parameters: a frame structure, a retransmission policy, or a Modulation and coding scheme.

Optionally, the N transmission statuses include at least one of the following states:

a small-sized packet transmission state, a common transmission state, or a large-throughput transmission state.

Optionally, when the N transmission statuses include the small-sized packet transmission state, in a transmission parameter set corresponding to the small-sized packet transmission state:

if the transmission parameter includes a frame structure, the frame structure is a frame structure with a frame length less than 1 ms;

if the transmission parameter includes a retransmission policy, the retransmission policy is fast retransmission; or if the transmission parameter includes a Modulation and coding scheme, the Modulation and coding scheme is a multi-element low-density parity-check code or a polar code.

Optionally, when the N transmission statuses include the large-throughput transmission state, in a transmission parameter set corresponding to the large-throughput transmission state:

if the transmission parameter includes a frame structure, the frame structure is a frame structure with a frame length greater than 1 ms;

if the transmission parameter includes a retransmission policy, the retransmission policy is rateless transmission; or if the transmission parameter includes a Modulation and coding scheme, the Modulation and coding scheme is a low-density parity-check code.

Optionally, when the N transmission statuses include the common transmission state, in a transmission parameter set corresponding to the common transmission state:

if the transmission parameter includes a frame structure, the frame structure is a frame structure with a frame length equal to 1 ms;

if the transmission parameter includes a retransmission policy, the retransmission policy is standard retransmission; or if the transmission parameter includes a Modulation and coding scheme, the Modulation and coding scheme is a low-density parity-check code or a Turbo code.

Optionally, the modulation parameter set includes a codebook, the codebook is a set of a code word, and the code word is used to indicate a mapping relationship between an information bit and a modulation symbol.

Optionally, the code word is a sparse code multiple access SCMA code word, and the codebook is an SCMA codebook.

Optionally, the device is the transmit end device, and the transmit end device is a terminal device.

The transmitter of the device 700 may include a transmitter circuit, a power controller, an encoder, and an antenna. The device 700 may further include a receiver, and the receiver may include a receiver circuit, a power controller, a decoder, and an antenna.

The processor may also be referred to as a CPU. The memory may include a read-only memory and a random access memory, and provide an instruction and data for the processor. A part of the memory may further include a non-volatile random access memory (NVRAM). In specific application, the device 700 may be built in or may be a wireless communications device such as a mobile phone or a network device such as a base station, and may further include a carrier that accommodates a transmitter circuit and a receiver circuit, so as to allow data transmitting and receiving between the device 700 and a remote location. The transmitter circuit and the receiver circuit may be coupled to the antenna. All components of the device 700 may be coupled together by using the bus. The bus further includes a power bus, a control bus, and a status signal bus in addition to a data bus. However, for clear description, all kinds of buses are marked as the bus 710 in the figure. In specific different products, the decoder may be integrated with the processing unit.

The processor may implement or execute all steps and logical block diagrams that are disclosed in the method embodiments of the present invention. A general purpose processor may be a microprocessor, or the processor may be any conventional processor, decoder, or the like. Steps of the method disclosed with reference to this embodiment of the present invention may be directly executed and accomplished by a hardware processor, or may be executed and accomplished by a combination of hardware and a software module in a decoding processor. The software module may be located in a mature storage medium in the field, such as a random access memory, a flash memory, a read-only memory, a programmable read-only memory or an electrically-erasable programmable memory, or a register.

It should be understood that, in this embodiment of the present invention, the processor 720 may be a central processing unit (Central Processing Unit, "CPU" for short), or the processor 720 may be another general purpose processor, a digital signal processor (DSP), an application-specific integrated circuit (ASIC), a field programmable gate array (FPGA) or another programmable logical device, a discrete gate or transistor logic device, a discrete hardware component, or the like. The general purpose processor may be a microprocessor, or the processor may be any conventional processor or the like.

The memory 730 may include a read-only memory and a random access memory, and provide an instruction and data for the processor 720. A part of the memory 730 may further include a non-volatile random access memory. For example, the memory 730 may further store information about a device type.

The bus system 710 may further include a power bus, a control bus, and a status signal bus in addition to a data bus. However, for clear description, all kinds of buses are marked as the bus system 710 in the figure.

In an implementation process, steps of the foregoing method may be performed by an integrated logical circuit in hardware or by an instruction in a form of software in the processor 720. Steps of the method disclosed with reference to this embodiment of the present invention may be directly executed and accomplished by a hardware processor, or may be executed and accomplished by a combination of hardware and a software module in a processor. The software module may be located in a mature storage medium in the field, such as a random access memory, a flash memory, a read-only memory, a programmable read-only memory or an electrically-erasable programmable memory, or a register. The storage medium is located in the memory 730, and the processor 720 reads information from the memory 730 and performs, with reference to hardware thereof, the steps in the foregoing method. To avoid repetition, details are not described herein.

The information transmission device 700 according to this embodiment of the present invention may be corresponding to a transmit end device (for example, UE#1) in the method in the embodiments of the present invention. In addition, all units or modules, and the foregoing other operations and/or functions of the information transmission device 700 are separately for implementing corresponding procedures of the method 300 in FIG. 4. For brevity, details are not described herein.

According to the information transmission device in this embodiment of the present invention, a transmit end device may determine a modulation parameter set corresponding to a transmission status of the transmit end device in a second time period, and in a first time period earlier than the second time period, perform, based on the modulation parameter set, modulation processing on data that needs to be sent to a receive end device, and send a generated symbol to the receive end device, so that the receive end device can determine, according to the received symbol, the modulation parameter set used by the transmit end device, and further can determine the transmission status that is of the transmit end device in the second time period and that is corresponding to the modulation parameter set. Therefore, the transmit end device and the receive end device may select, in the second time period, an air interface transmission technology corresponding to the transmission status, to implement notification of the transmission status when an interaction process and system resource overheads are reduced, which can simplify interaction between the transmit end device and the receive end device, and reduce communication resource overheads.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmission status determining method, wherein the method comprises:
   receiving, by a receive end device in a first time period, a first symbol sequence sent by a transmit end device;
   determining a first modulation parameter set according to the first symbol sequence, wherein the first modulation parameter set is a modulation parameter set used when the transmit end device performs modulation processing to generate the first symbol sequence, and the modulation parameter set comprises at least one of the following: a constellation point set or a codebook; and
   determining, according to preset first mapping relationship information, a first transmission status corresponding to the first modulation parameter set as a transmission status of the transmit end device in a second time period, wherein the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and N≥2,
   wherein the determining the first modulation parameter set according to the first symbol sequence comprises:
   intercepting a symbol subsequence from the first symbol sequence, wherein the symbol subsequence comprises at least two symbols; and
   determining the first modulation parameter set according to the symbol subsequence.

2. The method according to claim 1, further comprising:
   determining, according to preset second mapping relationship information, a second transmission parameter set corresponding to the first transmission status, wherein the second mapping relationship information is used to indicate a one-to-one mapping relationship between the N transmission statuses and N transmission parameter sets, the second transmission parameter set belongs to the N transmission parameter sets, and each transmission parameter set comprises at least one of the following transmission parameters: a frame structure, a retransmission policy, or a Modulation and coding scheme.

3. The method according to claim 2, further comprising:
   receiving, in the second time period according to the second transmission parameter set, a second symbol sequence transmitted by the transmit end device.

4. The method according to claim 3, wherein the second symbol sequence comprises symbols generated after modulation processing is performed based on a second modulation parameter set, the second modulation parameter set is corresponding to a second transmission status, the second transmission status is a transmission status of the transmit end device in a third time period, and the third time period is later than the second time period.

5. The method according to claim 2, wherein when the N transmission statuses comprise the small-sized packet transmission state, in a transmission parameter set corresponding to the small-sized packet transmission state:

if the transmission parameter set comprises a frame structure, the frame structure is a frame structure with a frame length less than 1 ms;
if the transmission parameter comprises a retransmission policy, the retransmission policy is fast retransmission; or
if the transmission parameter comprises a Modulation and coding scheme, the Modulation and coding scheme is a multi-element low-density parity-check code or a polar code.

6. The method according to claim 2, wherein when the N transmission statuses comprise the large-throughput transmission state, in a transmission parameter set corresponding to the large-throughput transmission state:
if the transmission parameter comprises a frame structure, the frame structure is a frame structure with a frame length greater than 1 ms;
if the transmission parameter comprises a retransmission policy, the retransmission policy is rateless transmission; or
if the transmission parameter comprises a Modulation and coding scheme, the Modulation and coding scheme is a low-density parity-check code.

7. The method according to claim 2, wherein when the N transmission statuses comprise the common transmission state, in a transmission parameter set corresponding to the common transmission state:
if the transmission parameter comprises a frame structure, the frame structure is a frame structure with a frame length equal to 1 ms;
if the transmission parameter comprises a retransmission policy, the retransmission policy is standard retransmission; or
if the transmission parameter comprises a Modulation and coding scheme, the Modulation and coding scheme is a low-density parity-check code or a Turbo code.

8. The method according to claim 1, wherein the receiving, by the receive end device in the first time period, the first symbol sequence sent by the transmit end device comprises:
when it is determined that no information is transmitted between the transmit end device and the receive end device within a first preset duration range earlier than the first time period, receiving, by the receive end device in the first time period according to a preset first transmission parameter set, the first symbol sequence sent by the transmit end device, wherein the first transmission parameter set comprises at least one of the following transmission parameters: a frame structure, a retransmission policy, or a Modulation and coding scheme.

9. The method according to claim 1, wherein the symbol sub sequence comprises:
the first K symbols in the first symbol sequence, where K is a preset value, and K≥2; or
symbols in the first symbol sequence that are received when quality of a channel between the receive end device and a network device meets a preset condition.

10. The method according to claim 1, wherein the N transmission statuses comprise at least one of the following states:
a small-sized packet transmission state, a common transmission state, or a large-throughput transmission state.

11. The method according to claim 1, wherein the modulation parameter set comprises a codebook, the codebook is a set of a code word, and the code word is used to indicate a mapping relationship between an information bit and a modulation symbol.

12. The method according to claim 11, wherein the code word is a sparse code multiple access (SCMA) code word, and the codebook is an (SCMA) codebook.

13. A transmission status determining device, wherein the device comprises:
a bus;
a processor connected to the bus;
a memory connected to the bus; and
a receiver connected to the bus,
wherein the processor invokes, by using the bus, a program stored in the memory that configures the processor to:
control the receiver to receive, in a first time period, a first symbol sequence sent by a transmit end device;
determine a first modulation parameter set according to the first symbol sequence, wherein the first modulation parameter set is a modulation parameter set used when the transmit end device performs modulation processing to generate the first symbol sequence, and the modulation parameter set comprises at least one of the following: a constellation point set or a codebook; and
determine, according to preset first mapping relationship information, a first transmission status corresponding to the first modulation parameter set as a transmission status of the transmit end device in a second time period, wherein the first mapping relationship information is used to indicate a one-to-one mapping relationship between N transmission statuses and N modulation parameter sets, the first modulation parameter set belongs to the N modulation parameter sets, the first transmission status belongs to the N transmission statuses, the second time period is later than the first time period, and N≥2,
wherein to determine the first modulation parameter set according to the first symbol sequence, the processor is configured to:
intercept a symbol subsequence from the first symbol sequence, wherein the symbol subsequence comprises at least two symbols; and
determine the first modulation parameter set according to the symbol subsequence.

14. The device according to claim 13, wherein the processor is further configured to determine, according to preset second mapping relationship information, a second transmission parameter set corresponding to the first transmission status, wherein the second mapping relationship information is used to indicate a one-to-one mapping relationship between the N transmission statuses and N transmission parameter sets, the second transmission parameter set belongs to the N transmission parameter sets, and each transmission parameter set comprises at least one of the following transmission parameters: a frame structure, a retransmission policy, or a Modulation and coding scheme.

15. The device according to claim 14, wherein the processor is further configured to control the receiver to receive, in the second time period according to the second transmission parameter set, a second symbol sequence transmitted by the transmit end device.

16. The device according to claim 15, wherein the second symbol sequence comprises symbols generated after modulation processing is performed based on a second modulation parameter set, the second modulation parameter set is corresponding to a second transmission status, the second transmission status is a transmission status of the transmit end device in a third time period, and the third time period is later than the second time period.

17. The device according to claim 14, wherein when the N transmission statuses comprise the large-throughput transmission state, in a transmission parameter set corresponding to the large-throughput transmission state:
if the transmission parameter comprises a frame structure, the frame structure is a frame structure with a frame length greater than 1 ms;
if the transmission parameter comprises a retransmission policy, the retransmission policy is rateless transmission; or
if the transmission parameter comprises a Modulation and coding scheme, the Modulation and coding scheme is a low-density parity-check code.

18. The device according to claim 14, wherein when the N transmission statuses comprise the common transmission state, in a transmission parameter set corresponding to the common transmission state:
if the transmission parameter comprises a frame structure, the frame structure is a frame structure with a frame length equal to 1 ms;
if the transmission parameter comprises a retransmission policy, the retransmission policy is standard retransmission; or
if the transmission parameter comprises a Modulation and coding scheme, the Modulation and coding scheme is a low-density parity-check code or a Turbo code.

19. The device according to claim 13, wherein the processor is configured to: when it is determined that no information is transmitted between the transmit end device and the receive end device within a first preset duration range earlier than the first time period, control the receiver to receive, in the first time period according to a preset first transmission parameter set, the first symbol sequence sent by the transmit end device, wherein the first transmission parameter set comprises at least one of the following transmission parameters: a frame structure, a retransmission policy, or a Modulation and coding scheme.

20. The device according to claim 13, wherein the symbol subsequence is the first K symbols in the first symbol sequence, K is a preset value, and K≥2; or
the symbol subsequence comprises symbols in the first symbol sequence that are received when quality of a channel between the receive end device and the network device meets a preset condition.

21. The device according to claim 13, wherein the N transmission statuses comprise at least one of the following states:
a small-sized packet transmission state, a common transmission state, or a large-throughput transmission state.

22. The device according to claim 14, wherein when the N transmission statuses comprise the small-sized packet transmission state, in a transmission parameter set corresponding to the small-sized packet transmission state:
if the transmission parameter comprises a frame structure, the frame structure is a frame structure with a frame length less than 1 ms;
if the transmission parameter comprises a retransmission policy, the retransmission policy is fast retransmission; or
if the transmission parameter comprises a Modulation and coding scheme, the Modulation and coding scheme is a multi-element low-density parity-check code or a polar code.

23. The device according to claim 13, wherein the modulation parameter set comprises a codebook, the codebook is a set of a code word, and the code word is used to indicate a mapping relationship between an information bit and a modulation symbol.

24. The device according to claim 23, wherein the code word is a sparse code multiple access SCMA code word, and the codebook is an SCMA codebook.

* * * * *